(12) United States Patent
Ishida

(10) Patent No.: US 12,241,750 B2
(45) Date of Patent: Mar. 4, 2025

(54) ROUTE ARBITRATION APPARATUS, AUTOMATIC DRIVING CONTROLLER, AND AUTOMATIC DRIVING AND ROUTE ARBITRATION SYSTEM

(71) Applicant: Mitsubishi Electric Corporation, Tokyo (JP)

(72) Inventor: Ryo Ishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 320 days.

(21) Appl. No.: 17/799,108

(22) PCT Filed: Mar. 24, 2020

(86) PCT No.: PCT/JP2020/012850
§ 371 (c)(1),
(2) Date: Aug. 11, 2022

(87) PCT Pub. No.: WO2021/191995
PCT Pub. Date: Sep. 30, 2021

(65) Prior Publication Data
US 2023/0078294 A1    Mar. 16, 2023

(51) Int. Cl.
G01C 21/34 (2006.01)
B60W 60/00 (2020.01)
G08G 1/16 (2006.01)

(52) U.S. Cl.
CPC ....... *G01C 21/3461* (2013.01); *B60W 60/001* (2020.02); *G08G 1/162* (2013.01); *G08G 1/167* (2013.01)

(58) Field of Classification Search
CPC . G01C 21/3461; B60W 60/001; G08G 1/162; G08G 1/167; G08G 1/0965;
(Continued)

(56) References Cited

U.S. PATENT DOCUMENTS

2017/0345310 A1  11/2017  Yoon
2018/0061236 A1  3/2018  Yamamoto
(Continued)

FOREIGN PATENT DOCUMENTS

DE  10 2015 200 765 A1  7/2016
JP      2018-181035 A    11/2018
(Continued)

OTHER PUBLICATIONS

Chinese Office Action dated Jul. 28, 2023 in Chinese Application No. 202080098324.7.
(Continued)

*Primary Examiner* — Rodney A Butler
(74) *Attorney, Agent, or Firm* — Sughrue Mion, PLLC

(57) ABSTRACT

To provide a route arbitration apparatus, an automatic driving controller, and an automatic driving and route arbitration system which can avoid an overlapping between travel routes and make vehicles carry out a traveling operation smoothly while considering priority between vehicles, in a broad perspective, about a multiple of vehicles existing in a periphery. A route arbitration apparatus receives a target travel route from each vehicle; when it is determined that a mutual overlapping of the target travel routes occurs, determines a priority travel area which is an area where the highest priority vehicle can travel in accordance with the target travel route, transmits the priority travel area to the highest priority vehicle, determines an avoidance travel area which is an area where the low priority vehicle can travel while avoiding the priority travel area, and transmits the avoidance travel area to the low priority vehicle.

25 Claims, 19 Drawing Sheets

(58) Field of Classification Search
CPC ....... G08G 1/096716; G08G 1/096725; G08G 1/164; G08G 1/166; G08G 1/096844; G08G 1/096861
See application file for complete search history.

(56) References Cited

U.S. PATENT DOCUMENTS

2018/0327029 A1    11/2018  Oooka et al.
2018/0329429 A1*   11/2018  Yamaguchi .......... G05D 1/0291

FOREIGN PATENT DOCUMENTS

JP    2019-200529 A    11/2019
WO    2016/147623 A1    9/2016
WO    2019/138488 A1    7/2019

OTHER PUBLICATIONS

Notice of Reasons for Refusal dated Jan. 10, 2023 from the Japanese Patent Office in Japanese Application No. 2022-509802.
International Search Report for PCT/JP2020/012850 dated Jun. 30, 2020 (PCT/ISA/210).
Extended European Search Report issued Feb. 27, 2023 in European Application No. 20926826.7.
Chinese Office Action issued Apr. 4, 2024 in Application No. 202080098324.7.
Notice of Reasons for Refusal dated Sep. 27, 2022 from the Japanese Patent Office in Japanese Application No. 2022-509802.

* cited by examiner

| TIME | LATITUDE | LONGITUDE | VEHICLE SPEED | VEHICLE ORIENTATION |
|---|---|---|---|---|
| 10:51:40:000 | 135.000000 | 35.123341 | 60.38 | 0.00088 |
| 10:51:40:100 | 135.002311 | 35.123343 | 60.49 | 0.00142 |
| 10:51:40:200 | 135.004623 | 35.123347 | 60.29 | 0.00263 |
| 10:51:40:300 | 135.006934 | 35.123353 | 60.32 | 0.00596 |
| 10:51:40:400 | 135.009245 | 35.123366 | 60.40 | 0.01454 |
| 10:51:40:500 | 135.011557 | 35.123400 | 60.59 | 0.01454 |
| 10:51:40:600 | 135.013868 | 35.123434 | 60.16 | 0.00596 |
| 10:51:40:700 | 135.016179 | 35.123447 | 60.23 | 0.00263 |
| 10:51:40:800 | 135.018491 | 35.123453 | 60.00 | 0.00142 |
| 10:51:40:900 | 135.020802 | 35.123457 | 60.01 | 0.00088 |
| 10:51:41:000 | 135.023113 | 35.123459 | 60.50 | 0.00000 |

| SMALL GROUP IDENTIFICATION CODE | VEHICLE IDENTIFICATION CODE |
|---|---|
| 0 | 321-0909 |
| 0 | 421-3210 |
| 0 | 213-3211 |
| 1 | 312-4130 |
| 1 | 321-3114 |
| 1 | 312-3124 |
| 1 | 411-3121 |
| 2 | 132-3129 |
| 3 | 312-3129 |
| 4 | 319-3210 |
| 4 | 321-4219 |

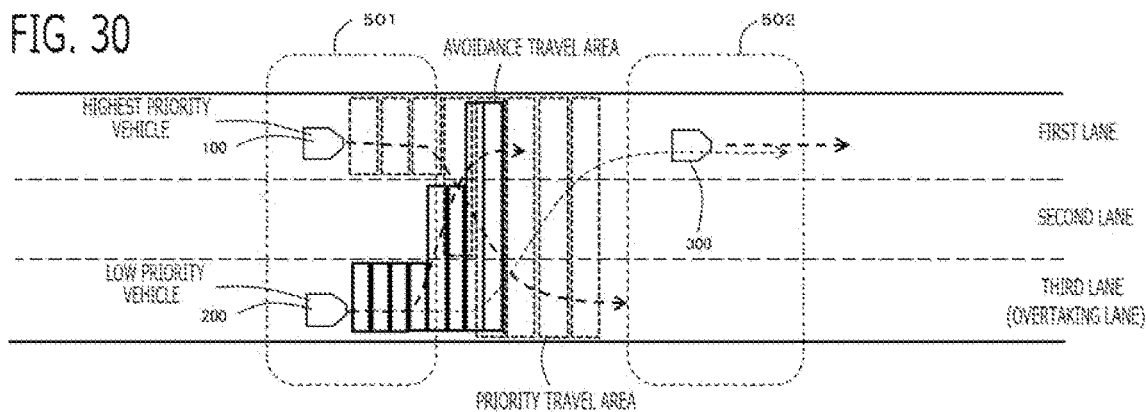
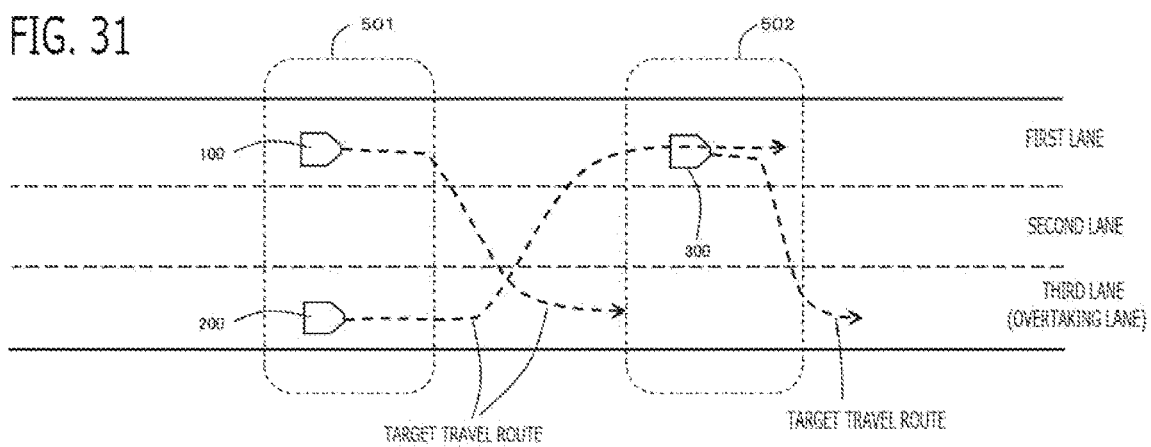
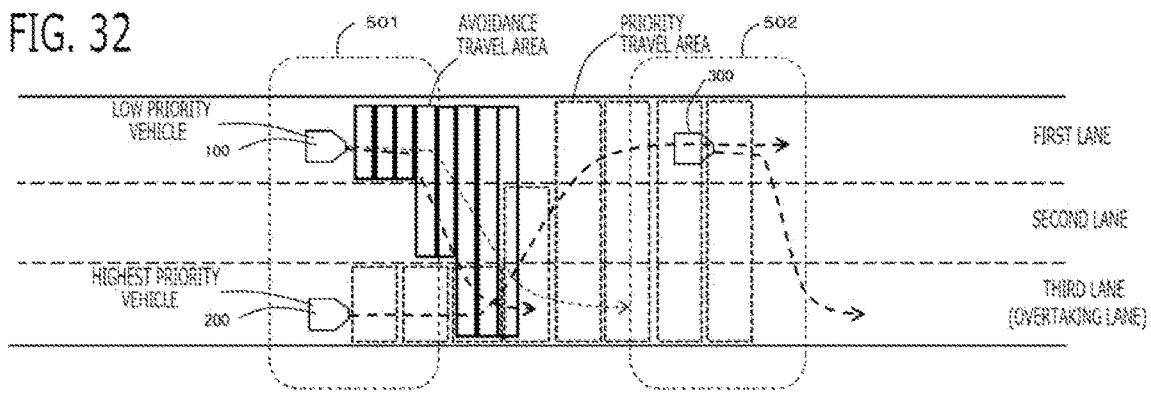
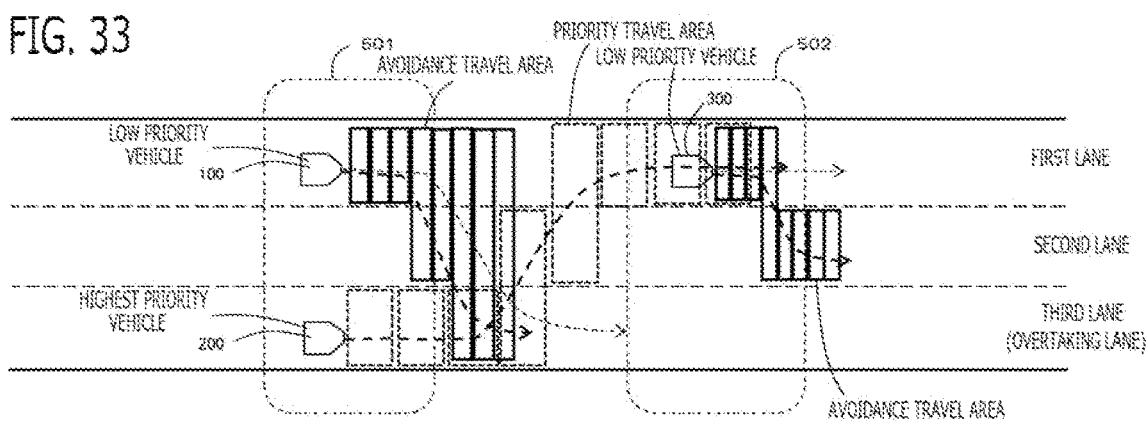

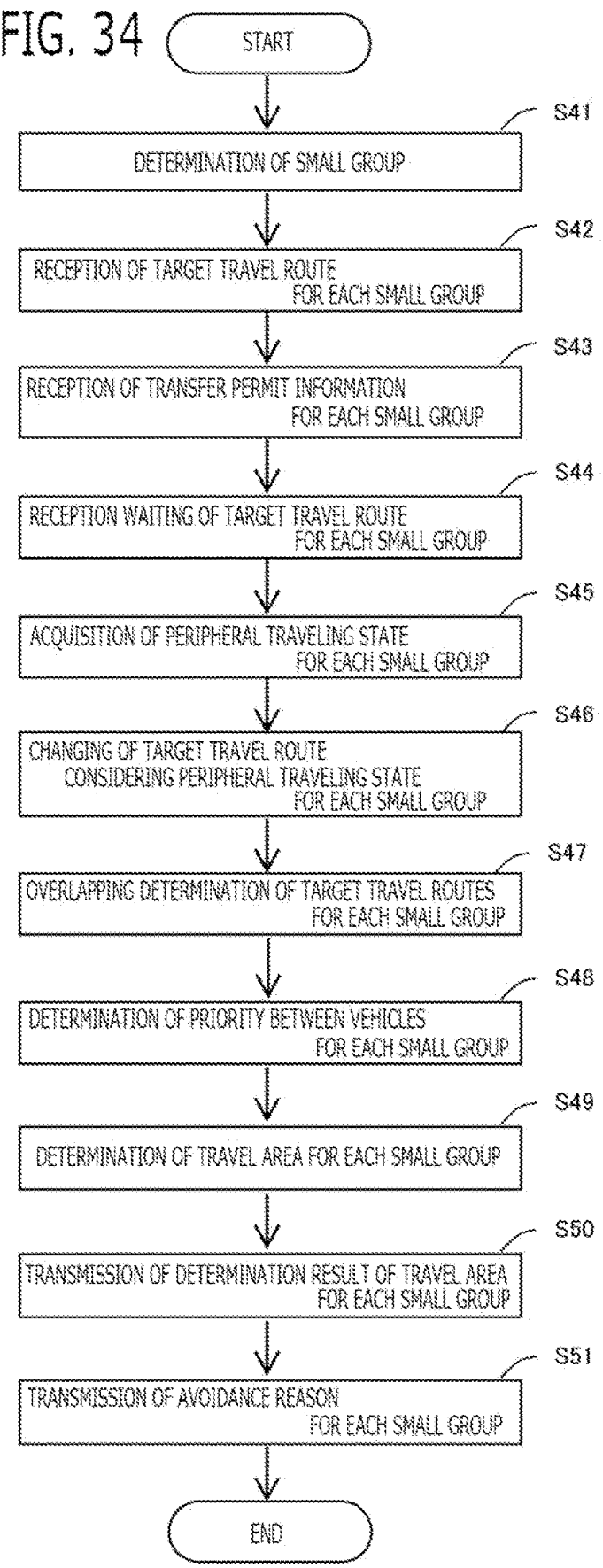

ROUTE ARBITRATION APPARATUS, AUTOMATIC DRIVING CONTROLLER, AND AUTOMATIC DRIVING AND ROUTE ARBITRATION SYSTEM

CROSS REFERENCE TO RELATED APPLICATIONS

This application is a National Stage of International Application No. PCT/JP2020/012850 filed Mar. 24, 2020.

TECHNICAL FIELD

The present disclosure is related with a route arbitration apparatus, an automatic driving controller, and an automatic driving and route arbitration system.

BACKGROUND ART

Technology such that, when a vehicle changes lane or merges using automatic driving, an actual traveling operation is carried out after first carrying out inter-vehicle communication between vehicles, thereby communicating safety confirmation, is disclosed in patent document 1.

CITATION LIST

Patent Literature

Patent document 1: WO 2016/147623

SUMMARY OF INVENTION

Technical Problem

The technology of patent document 1 is configured in such a way that a vehicle which carries out a lane change transmits a lane change request to a vehicle traveling in a lane which is a lane change destination. However, the technology of patent document 1 is such that a vehicle which receives a lane change request only evaluates the safety of its own traveling and permits a lane change, and does not evaluate safety in a broader perspective by considering behavior of a third party vehicle.

Accordingly, the technology of patent document 1 is such that when, for example, a first vehicle traveling in a first traveling lane and a third vehicle traveling in a third traveling lane simultaneously plan a lane change to a second traveling lane, and a transmit a request to change lane to the second traveling lane to a second vehicle traveling in the second traveling lane, there is a possibility that the second vehicle, when able to travel safely itself, will permit the first vehicle and the third vehicle to change lane. Therefore, there is a possibility that the first vehicle and the second vehicle, which have simultaneously changed lane to the second traveling lane, will come into proximity, and a sudden evasive operation will be necessary.

Also, the necessity to carryout a lane change differs depending on a vehicle, such as a vehicle that carries out a merging or a diverging, a vehicle that avoids an obstacle, or an emergency vehicle. Therefore, there is a need to allow a vehicle with a high necessity to change lane to change lane with priority.

Then, the purpose of the present disclosure is to provide a route arbitration apparatus, an automatic driving controller, and an automatic driving and route arbitration system which can avoid an overlapping between travel routes and make vehicles carry out a traveling operation smoothly while considering priority between vehicles, in a broad perspective, about a multiple of vehicles existing in a periphery.

Solution to Problem

A route arbitration apparatus according to the present disclosure including:
- a communication unit that communicates with a multiple of vehicles;
- a target route receiving unit that receives a target travel route from each vehicle;
- a route overlapping determining unit that determines whether or not the target travel routes of respective vehicles overlap with each other;
- a priority determining unit that determines priority between vehicles; and
- a travel area determining unit that, when it is determined that a mutual overlapping of the target travel routes occurs, determines a priority travel area which is an area where the highest priority vehicle which is a vehicle with the highest priority among the overlapping vehicles whose target travel routes were determined to overlap mutually can travel in accordance with the target travel route of the highest priority vehicle, and determines an avoidance travel area which is an area where a low priority vehicle which is a vehicle other than the highest priority vehicle among the overlapping vehicles can travel while avoiding the priority travel area; and
- a travel area transmitting unit that transmits the priority travel area to the highest priority vehicle via the communication unit and makes the highest priority vehicle travel within the priority travel area, and transmits the avoidance travel area to the low priority vehicle and makes the low priority vehicle travel within the avoidance travel area.

An automatic driving controller according to the present disclosure including:
- a recognition unit that recognizes a peripheral traveling state of an own vehicle;
- a target travel route generation unit that determines a target travel route where the own vehicle travels, considering the peripheral traveling state;
- a management unit that transmits the target travel route to a route arbitration apparatus which arbitrates traveling routes of a multiple of vehicles via a communication device, and receives a priority travel area or an avoidance travel area from the route arbitration apparatus;
- a target travel route changing unit that changes the target travel route considering the peripheral traveling state so that the target travel route becomes within the priority travel area or the avoidance travel area, when the priority travel area or the avoidance travel area was received; and
- a vehicle control unit that makes the own vehicle travel along with the target travel route.

An automatic driving and route arbitration system according to the present disclosure including:
- the route arbitration apparatus; and
- a multiple of vehicles each of which mounted the automatic driving controller.

Advantage of Invention

According to the route arbitration apparatus of the present disclosure, an overlapping of travel routes can be predicted in advance, based on a received multiple of vehicle target travel routes. Then, the priority between vehicles is determined, and the priority travel area which is an area where the highest priority vehicle can travel in accordance with the target travel route of the highest priority vehicle is determined and transmitted to the highest priority vehicle with the highest priority. The highest priority vehicle can be made to travel in accordance with the target travel route of the highest priority vehicle within the priority travel area preferentially. The avoidance travel area which is an area where the low priority can travel while avoiding the priority travel area is determined and transmitted to the priority vehicle. The low priority vehicle can be made to travel within the avoidance travel area, and an avoidance travel for avoiding contact with the highest priority vehicle can be performed. Therefore, an overlapping of travel routes is avoided in advance, and each vehicle can be made to carry out a smooth traveling operation. In this case, since a travel route is not transmitted to each vehicle but the travel area where each vehicle can travel is transmitted, while making each vehicle consider a peripheral traveling state that each vehicle recognized, each vehicle can travel safely and appropriately within the travel area with flexibility.

According to the automatic driving controller of the present disclosure, since a travel route is not transmitted to each vehicle from the route arbitration apparatus but the travel area where each vehicle can travel is transmitted, while making each vehicle consider a peripheral traveling state that each vehicle recognized, each vehicle can travel safely and appropriately within the travel area with flexibility.

BRIEF DESCRIPTION OF THE DRAWINGS

FIG. 30 is a schematic diagram for explaining determination of the travel area according to Embodiment 3;

FIG. 31 is a schematic diagram for explaining determination of the travel area according to Embodiment 3;

FIG. 32 is a schematic diagram for explaining determination of the travel area according to Embodiment 3;

FIG. 33 is a schematic diagram for explaining determination of the travel area according to Embodiment 3;

FIG. 34 is a flowchart for explaining the processing of the route arbitration apparatus according to Embodiment 3;

DETAILED DESCRIPTION OF THE EMBODIMENTS

1. Embodiment 1

Figure 1:
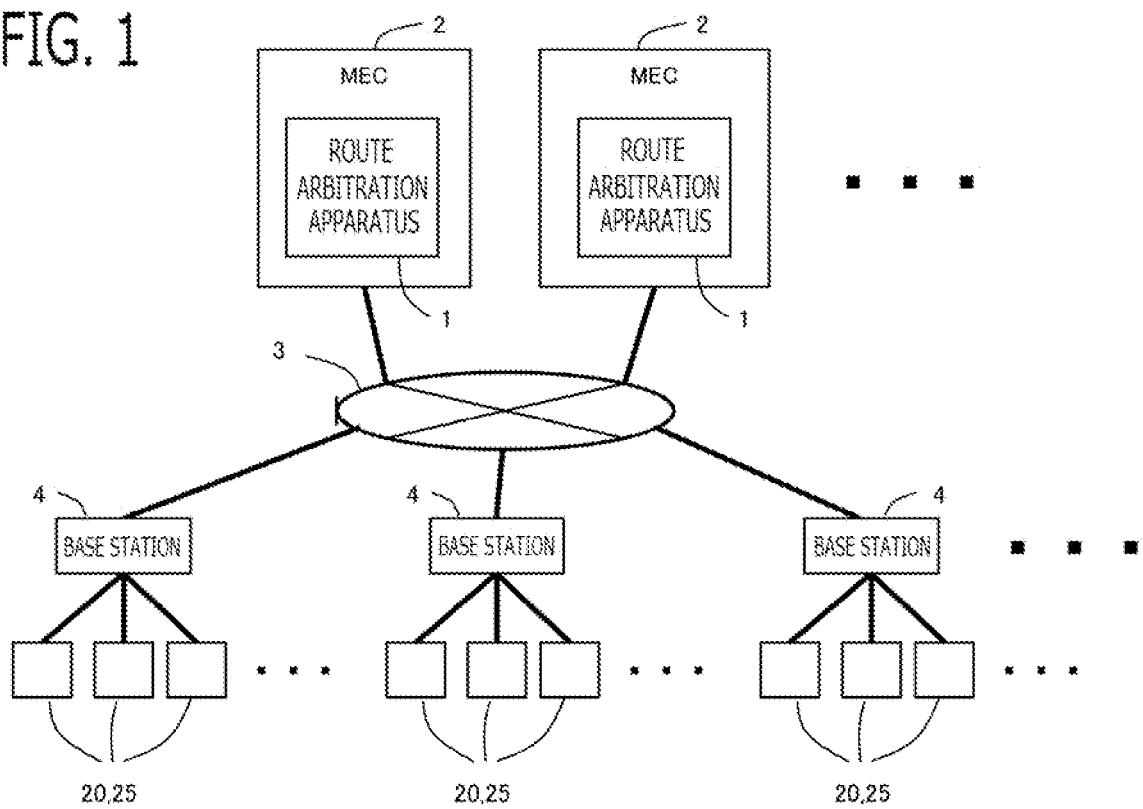
FIG. 1 is a schematic configuration diagram of the automatic driving and route arbitration system according to Embodiment 1.

An automatic driving and route arbitration system which is provided with a route arbitration apparatus 1 and a multiple of vehicles 20 each of which mounts the automatic driving controller 25 according to Embodiment 1 will be explained with reference to drawings. FIG. 1 is a figure showing a schematic overall configuration of the automatic driving and route arbitration system.

The route arbitration apparatus 1 is provided in a server 2 connected to a network 3. That is, a function of the route arbitration apparatus 1 is realized by the server 2 executing an application (a program) of the route arbitration apparatus 1. In the present embodiment, a multiple of route arbitration apparatus 1 is provided, and shares and arbitrates traveling routes of a multiple of vehicles. The server 2 is a MEC (Multi-access Edge Computing) server, for example. The details of MEC are described in literature (ETSI GS MEC 003 V2.1.1 (2019-01)), for example. The network 3 is a core network, for example. The route arbitration apparatus 1 and the server 2 may be disposed close to an area to control.

Each vehicle 20 is connected to a near base station 4 via wireless communication. A multiple of base stations 4 are distributed and provided at each point so as to cover a road network. The base station 4 is a wireless station that performs wireless communication with a mobile terminal instrument mounted in a vehicle existing within a communication area, using a cellular wireless communications standard such as 4G or 5G, and is connected to the network 3. Therefore, each vehicle 20 and the route arbitration apparatus 1 are communicatively connected via the base station 4 and the network 3.

1-1. Configuration of Route Arbitration Apparatus 1

Figures 2, 3:
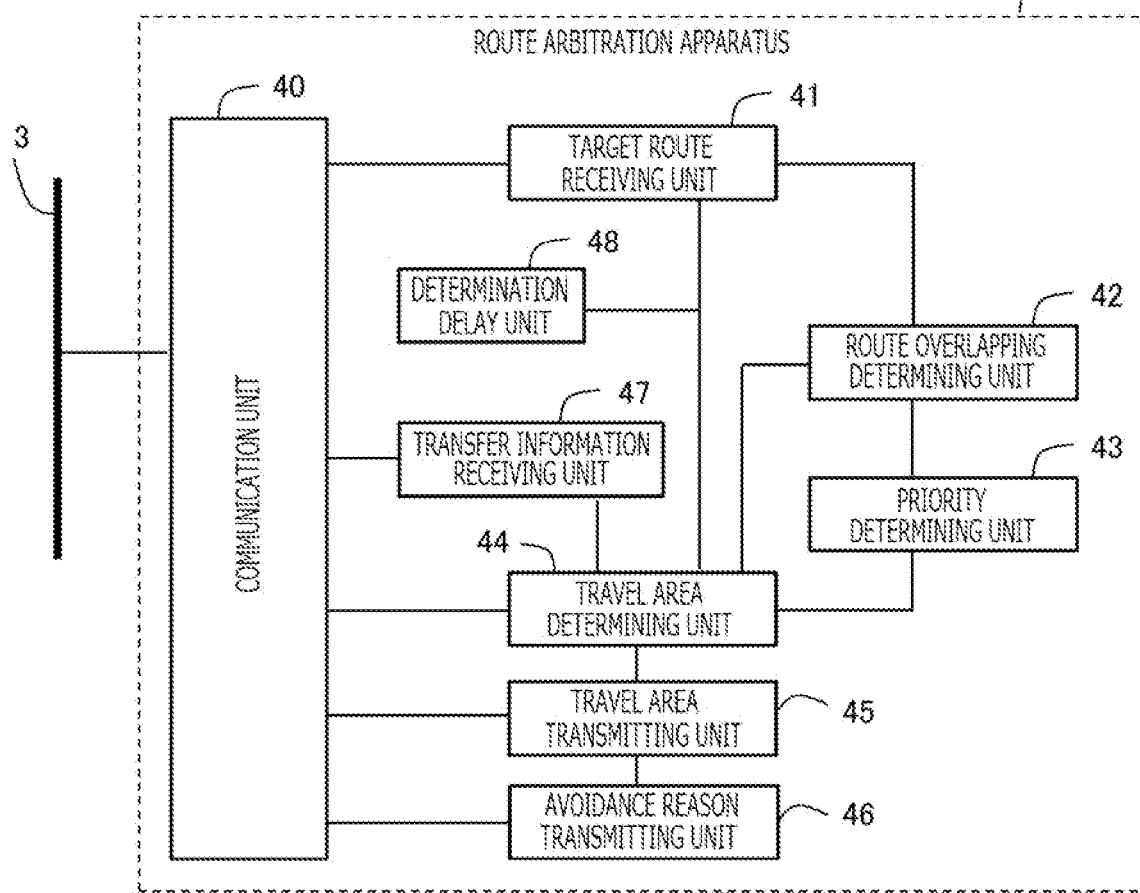
FIG. 2 is a schematic configuration diagram of the route arbitration apparatus according to Embodiment 1.
FIG. 3 is a figure for explaining data of the target travel route according to Embodiment 1.

FIG. 2 shows a schematic configuration diagram of the route arbitration apparatus 1. The route arbitration apparatus 1 is provided with a communication unit 40, a target route receiving unit 41, a route overlapping determining unit 42, a priority determining unit 43, a travel area determining unit 44, a travel area transmitting unit 45, an avoidance reason transmitting unit 46, a transfer information receiving unit 47, a determination delay unit 48, and the like.

The communication unit 40 communicates with a multiple of vehicles. In the present embodiment, as mentioned above, the communication unit 40 is connected to the network 3, and communicates with an arbitration object vehicle via the network 3 and the base station 4. The arbitration object vehicle is, for example, a vehicle positioned in a region being controlled by the route arbitration apparatus 1.

The target route receiving unit 41 receives a target travel route from each vehicle. In the present embodiment, the target travel route is time series data, such as a vehicle position (latitude, longitude, and altitude), a vehicle speed, and a vehicle orientation of each time. FIG. 3 shows an example of the time series data of the target travel route. In the example of FIG. 3, the time series data is formed of a time, a latitude, a longitude, a vehicle speed, and a vehicle orientation (for example, an azimuth of the forward and backward direction of the vehicle). The target travel route data includes basic information of vehicle, such as such as a vehicle category, a vehicle outline form, vehicle information, and a degree of urgency of the vehicle. The vehicle category is an ambulance, a police car, a route bus, a cargo vehicle, a taxi, a general passenger car, and a two-wheel motorbike, and the like, for example. The vehicle information is a vehicle performance, a vehicle state, a number of occupants, and the like, for example. The transfer information receiving unit 47 receives transfer permission information indicating that a travel route may be transferred to other vehicle, from each vehicle.

The determination delay unit 48 makes the determination of the route overlapping determining unit 42 described later delay, until the target travel routes are received from respective vehicles. According to this configuration, the determination of the route overlapping determining unit 42 can be performed in a state where the target travel routes of respective vehicles were received, and a determination accuracy of the route overlapping determining unit 42 can be improved. The determination delay unit 48 may manage the reception of the target travel routes for each a multiple of vehicles which are close with each other. When the target travel routes of respective vehicles are not received despite a preliminarily set waiting time elapsing, the determination delay unit 45 may make the determination of the route overlapping determining unit 42 start. The waiting time for each vehicle, as described above, may be set to a waiting time transmitted from each vehicle together with the target travel route.

The avoidance reason transmitting unit 46 transmits an avoidance reason that the avoidance travel area is determined, to the low priority vehicle in which the avoidance travel area is determined by the travel area determining unit 44 described below. A vehicle which receives the avoidance reason informs the avoidance reason to the occupant using the speaker 24b or the display 24c, as described later. The avoidance reason is, for example, "carrying out a lane change in order to give way to an emergency vehicle", "carrying out a lane change in order to give way to a vehicle on the right", "reducing speed in order to give way to a vehicle on the right", or "changing a travel route considering a peripheral traveling state". According to this configuration, the occupant of the low priority vehicle can be aware of the own vehicle traveling state, and convenience of the occupant can be improved.

<Necessity for Arbitration of Traveling Routes Between Vehicles>

When a mutual overlapping of the target travel routes between vehicles occurs, it is necessary to arbitrate so that the target travel routes between vehicles do not overlap mutually in order to prevent contact of vehicles. Especially, when a multiple of vehicles carry out a lane change at the same timing, since it is relatively difficult to predict the lane change of other vehicle beforehand, the target travel routes between vehicles may overlap mutually. In particular, the difficulty of predicting increases when two or more vehicles carry out a lane change simultaneously.

Figure 4:
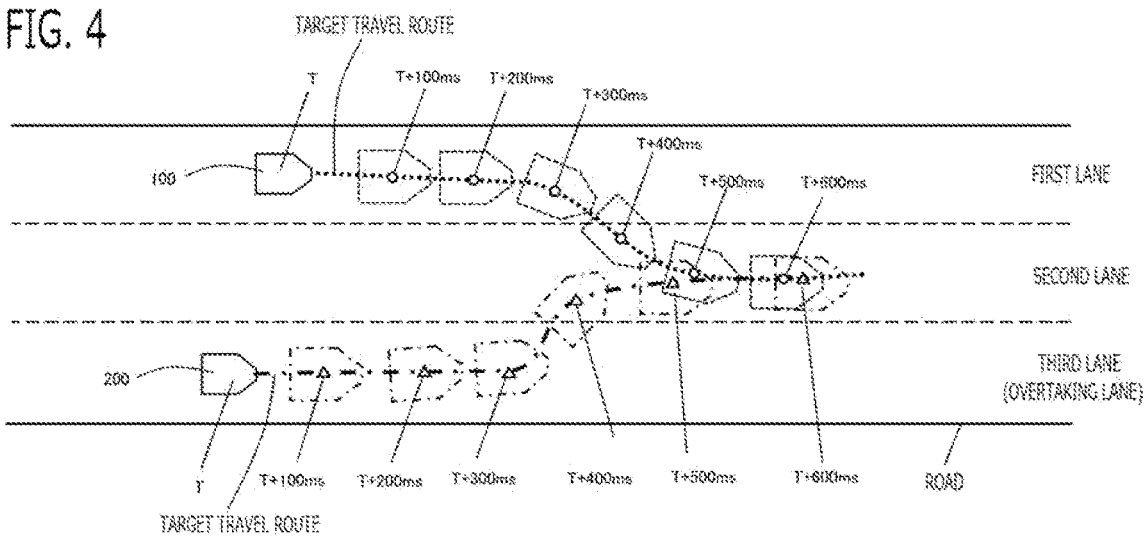
FIG. 4 is a schematic diagram for explaining determination of travel area of first case according to Embodiment 1.

An overlapping of travel routes accompanied with the lane change will be described using the example of FIG. 4. In FIG. 4, target travel routes received from a first vehicle 100 and a second vehicle 200 are visualized by being superimposed on a road form. The first vehicle 100 is starting a lane change 300 ms after a current time T (T+300 ms), and the second vehicle 200 is starting a lane change 300 ms after the current time T (T+300 ms). Then, a position of the first vehicle 100 and a position of the second vehicle 200 overlap with each other 500 ms (T+500 ms) and 600 ms (T+600 ms) after the current time T.

Even in this case, contact between the vehicles can be avoided by each vehicle carrying out autonomous self-driving, but a sudden traveling operation is necessary. Therefore, it is desirable that an overlapping of travel routes is predicted in advance, the overlapping of travel routes is avoided in advance, and a smooth traveling operation is carried out.

<Avoiding Overlapping of Traveling Lanes>

Then, the route overlapping determining unit 42 determines whether or not target travel routes of respective vehicles overlap with each other. The priority determining unit 43 determines priority between vehicles. When it is determined that a mutual overlapping of the target travel routes occurs, the travel area determining unit 44 determines a priority travel area which is an area where the highest priority vehicle which is a vehicle with the highest priority among the overlapping vehicles whose target traveling routes were determined to overlap mutually can travel in accordance with the target traveling route of the highest priority vehicle. And, the travel area determining unit 44 determines an avoidance travel area which is an area where a low priority vehicle which is a vehicle other than the highest priority vehicle among the overlapping vehicles can travel while avoiding the priority travel area. The travel area determining unit 44 transmits the priority travel area to the highest priority vehicle via the communication unit 40 and makes the highest priority vehicle travel within the priority travel area, and transmits the avoidance travel area to the low priority vehicle and makes the low priority vehicle travel within the avoidance travel area.

According to this configuration, an overlapping of travel routes can be predicted in advance, based on a received multiple of vehicle target travel routes. Then, the priority between vehicles is determined, and the priority travel area which is an area where the highest priority vehicle can travel in accordance with the target travel route of the highest priority vehicle is determined and transmitted to the highest priority vehicle with the highest priority. The highest priority vehicle can be made to travel in accordance with the target travel route of the highest priority vehicle within the priority travel area preferentially. The avoidance travel area which is an area where the low priority vehicle can travel while avoiding the priority travel area is determined and transmitted to the low priority vehicle. The low priority vehicle can be made to travel within the avoidance travel area, and an avoidance travel for avoiding contact with the highest priority vehicle can be performed. Therefore, an overlapping of travel routes is avoided in advance, and each vehicle can be made to carryout a smooth traveling operation.

In this case, since a travel route is not transmitted to each vehicle but the travel area where each vehicle can travel is transmitted, while making each vehicle consider a peripheral traveling state that each vehicle recognized, each vehicle can travel safely and appropriately within the travel area with flexibility.

Since the travel route of the high priority vehicle is prioritized, a vehicle flow in a traffic system can be smoothened, and a vehicle with a high degree of urgency can be made to travel with priority. Since the travel area is not transmitted to each vehicle when no mutual overlapping occurs, there is no impediment to the autonomous travel of each vehicle, and a vehicle flow in a traffic system can be smoothened. Hereafter, each configuration will be described in detail.

<Route Overlapping Determining Unit 42>

As mentioned above, the route overlapping determining unit 42 determines whether or not the received target travel routes of respective vehicles overlap with each other. For example, the route overlapping determining unit 42 determines whether or not the target travel routes of respective vehicles overlap with each other accompanied with a lane change. The lane change includes a changing a traveling lane on a road having a multiple of traveling lanes, a changing a traveling lane accompanied with moving from a current traveling road to another road (for example, a merging or a detachment at a point at which roads merge or diverge, or a left or right turn), and the like.

In the present embodiment, the route overlapping determining unit 42 determines a vehicle which carry out a lane change, based on the target travel route of each vehicle. For example, the route overlapping determining unit 42 compares the target travel route of each vehicle and high accuracy map data, and identifies a vehicle whose lane is changing, or identifies a vehicle that will carry out a lane change from a change in orientation of the vehicle. Then, the route overlapping determining unit 42 determines whether or not the position of a vehicle that will carry out a lane change is closer than a determination distance to the position of each other vehicle at each time. When there are two or more vehicles that will carry out a lane change, the route overlapping determining unit 42 carries out the same determination for each vehicle that will carry out a lane change.

The route overlapping determining unit 42 determines whether or not the target travel routes of respective vehicles overlaps mutually due to a difference of each vehicle speed in the same lane and the like although not accompanied with a lane change.

The route overlapping determining unit 42 determines inter-vehicle proximity by also considering the outline form of each vehicle and the orientation of each vehicle. A determination distance in the left and right direction from a vehicle is set to be shorter than a determination distance in the forward and backward direction from a vehicle so that two vehicles traveling side by side are not determined to be in proximity. The route overlapping determining unit 42 determines whether or not an inter-vehicle outline is closer than the left and right direction determination distance in the left or right direction from each vehicle, and determines whether or not the inter-vehicle outline is closer than the forward and backward direction determination distance in the forward or backward direction from each vehicle.

For example, in the example of FIG. 4, it is determined that the first vehicle 100 and the second vehicle 200, which will carry out a lane change, will overlap with each other from the time T+500 ms to T+600 ms.

<Priority Determining Unit 43>

As mentioned above, the priority determining unit 43 determines priority between vehicles. The priority between vehicles can also be expressed as an order of priority between vehicles. The priority determining unit 43 may determine priority between vehicles that were determined to be overlapped with each other, or may determine priority among vehicles that were determined to be overlapped with each other and vehicles in a periphery of the overlapping vehicles. In the latter case, a case where the travel routes of the vehicles in a periphery of the overlapping vehicles is affected by a change in the travel route of an overlapping vehicle can also be accommodated.

In the present embodiment, the priority determining unit 43 determines the priority between vehicles by combining a multiple of rules. For example, evaluation points are set for each rule, and higher evaluation points are set for a rule with higher priority. The priority determining unit 43 determines whether or not each rule is satisfied for each vehicle, totals up the evaluation points of the satisfied rules, and sets the total value as the evaluation points of the respective vehicle. Then, the priority determining unit 43 determines that a vehicle with higher evaluation points is a vehicle with higher priority. When there are a multiple of vehicles with the same evaluation points, the priority determining unit 43 prioritizes a vehicle selected at random.

For example, the following kinds of rules are included in the multiple of rules. The following rules are examples, and other arbitrary rules and evaluation points can be used. For example, a rule of rule 1 and a rule of rule 2 may be replaced. Information necessary for determining whether each rule is satisfied can also be obtained from each vehicle, high accuracy map data, and the like.

Rule 1: whether a vehicle is a vehicle such that a cause of impediment to the travel of the vehicle, such as an obstacle, a pedestrian, a decrease in lanes, or a roadwork site, lies ahead in the current traveling lane. Evaluation points 10.

Rule 2: whether a vehicle is an emergency vehicle such as an ambulance or a police car. Evaluation points 8.

Rule 3: whether a vehicle is a vehicle that is planned to move from the current traveling road to another road. Evaluation points 7.

Rule 4: whether a vehicle is a vehicle behind which an emergency vehicle is traveling in the current traveling lane. Evaluation points 5.

Rule 5: whether a vehicle is a vehicle of public transportation, such as a route bus. Evaluation points 4.

Rule 6: whether a vehicle is a vehicle positioned farther forward than other vehicle that is an object of priority determination. Evaluation points 4.

Rule 7: whether a vehicle is a vehicle whose speed is higher than other vehicle that is an object of priority determination. A set speed of an ACC (adaptive cruise control) may be used as the speed. Evaluation points 4.

Rule 8: whether a vehicle is a vehicle with a long body, or in a long vehicle group. Evaluation points 4.

Rule 9: whether a vehicle is a vehicle that is traveling in an overtaking lane or in a high speed lane. Evaluation points 4.

Rule 10: whether a vehicle is a vehicle that is nearer to a section in which a lane change is prohibited than other vehicle that is an object of priority determination. Evaluation points 4.

Rule 11: whether a vehicle is a vehicle with a larger number of occupants than other vehicle that is an object of priority determination. Evaluation points 4.

Rule 12: whether a vehicle is a vehicle that has recently ceded a lane. Evaluation points 4.

In this way, the priority determining unit 43 at least determines priority between vehicles by combining a multiple of rules relating to the necessity of a lane change. In the above described example, rule 1, rule 3, rule 4, rule 10, and the like, correspond to rules relating to the necessity of a lane change.

The priority determining unit 43 makes the priority of a vehicle from which transfer permission information was received lower than the priority of a vehicle from which transfer permission information was not received. For example, when there are a multiple of vehicles with the same evaluation points, the priority determining unit 43 makes the priority of a vehicle from which transfer permission information was received lower. Also, the priority determining unit 43 may reduce the evaluation points of a vehicle from which transfer permission information was received.

For example, in the example of FIG. 4, since the first vehicle 100 is positioned farther forward than the second vehicle 200, rule 6 is satisfied, and 4 points are added to the evaluation points of the first vehicle 100. On the other hand, since the second vehicle 200 is traveling in the overtaking lane, rule 9 is satisfied, and 4 points are added to the evaluation points of the second vehicle 200. And, since the speed of the second vehicle 200 is higher than the speed of the first vehicle 100, rule 7 is satisfied, and 4 points are added to the evaluation points of the second vehicle 200. Therefore, since the first vehicle 100 has a total of 4 evaluation points, and the second vehicle 200 has a total of 8 evaluation points, the priority of the second vehicle 200 is higher than the priority of the first vehicle 100.

<Travel Area Determining Unit 44>

As mentioned above, when it is determined that a mutual overlapping of the target travel routes occurs, the travel area determining unit 44 determines a priority travel area which is an area where the highest priority vehicle which is a vehicle with the highest priority among the overlapping vehicles whose target traveling routes were determined to overlap mutually can travel in accordance with the target traveling route of the highest priority vehicle. And, the travel area determining unit 44 determines an avoidance travel area which is an area where a low priority vehicle which is a vehicle other than the highest priority vehicle among the overlapping vehicles can travel while avoiding the priority travel area. Herein, "the priority travel area where the highest priority vehicle can travel in accordance with the target travel route of the highest priority vehicle" can be expressed as "an area where the highest priority vehicle can travel on the basis of the target travel route of the highest priority vehicle", "an area where the highest priority vehicle can travel including the target travel route of the highest priority vehicle", or the like.

In the present embodiment, the travel area determining unit 44 determines an area at each time point where the highest priority vehicle can travel in accordance with the target traveling route of the highest priority vehicle at future each time point, as the priority travel area. The travel area determining unit 44 determines an area at each time point where the low priority vehicle can travel while avoiding the priority travel area at each time point, as the avoidance travel area. That is to say, the travel area determining unit 44 determines time series areas, as the priority travel area and the avoidance travel area.

According to this configuration, since each travel area is set so as not to overlap with each other at each time point, the same area can be set to each travel area by shifting time. Accordingly, the travel area can be set more intricately. Then, each vehicle can travel within the travel area at each time point with flexibility.

The travel area determining unit 44 determines, as the priority travel area, an area which includes a multiple of traveling lanes including a traveling lane where the highest priority vehicle can travel and which does not become the disturbance of traveling of peripheral vehicle. And, the travel area determining unit 44 determines, as the avoidance travel area, an area which includes a multiple of traveling lanes including a traveling lane where the low priority vehicle can travel and which does not become the disturbance of traveling of peripheral vehicle.

According to this configuration, since an area including a multiple of traveling lanes is determined as the priority travel area if it is settable, the highest priority vehicle can travel safely and appropriately with flexibility within the multiple of traveling lanes determined in the priority travel area. Since an area including a multiple of traveling lanes is determined as the avoidance travel area if it is settable, the low priority vehicle can travel safely and appropriately with flexibility within the multiple of traveling lanes determined in the avoidance travel area. Since these multiple of traveling lanes include traveling lanes which does not become the disturbance of traveling of peripheral vehicle, traveling of the peripheral vehicle is not restricted more than necessary.

When determining the priority travel area of the highest priority vehicle, the travel area determining unit 44 considers a peripheral traveling state of the highest priority vehicle. When determining the avoidance travel area of the low priority vehicle, the travel area determining unit 44 considers a peripheral traveling state of the low priority vehicle.

According to this configuration, appropriate and safe the priority travel route and the avoidance travel route where the peripheral traveling state was considered can be determined.

Herein, the peripheral traveling state includes a traveling state of the peripheral vehicle of the highest priority vehicle or the low priority vehicle, a state of the traveling road in the periphery of the highest priority vehicle or the low priority vehicle, and the like. When the peripheral vehicle is a vehicle whose target travel route was received, the target travel route of the vehicle is used as the traveling state of the peripheral vehicle. When the peripheral vehicle is a vehicle whose target travel route was not received, a current traveling state of the vehicle (for example, the speed and the vehicle orientation) obtained from a road monitoring system or other vehicle is used as the traveling state of the peripheral vehicle. And, a road form, a lane, sign information, and the like, obtained from high accuracy map data is used as the state of the peripheral traveling road. And, an obstacle, a pedestrian, signal information, traffic jam information, and the like, obtained from a road monitoring system or other vehicle is used as the state of the peripheral traveling road. The road monitoring system is a system that monitors a road state, a traffic light state, a traveling vehicle state, and the like, based on various kinds of information.

Hereafter, a multiple of examples will be explained about the priority travel area and the avoidance travel area.

<First Case>

When a lane change is included in the target travel route of the highest priority vehicle, the travel area determining unit 44 determines an area where the highest priority vehicle can travel along a traveling lane which is a destination for the lane change and a current traveling lane, as the priority travel area.

Figure 5:
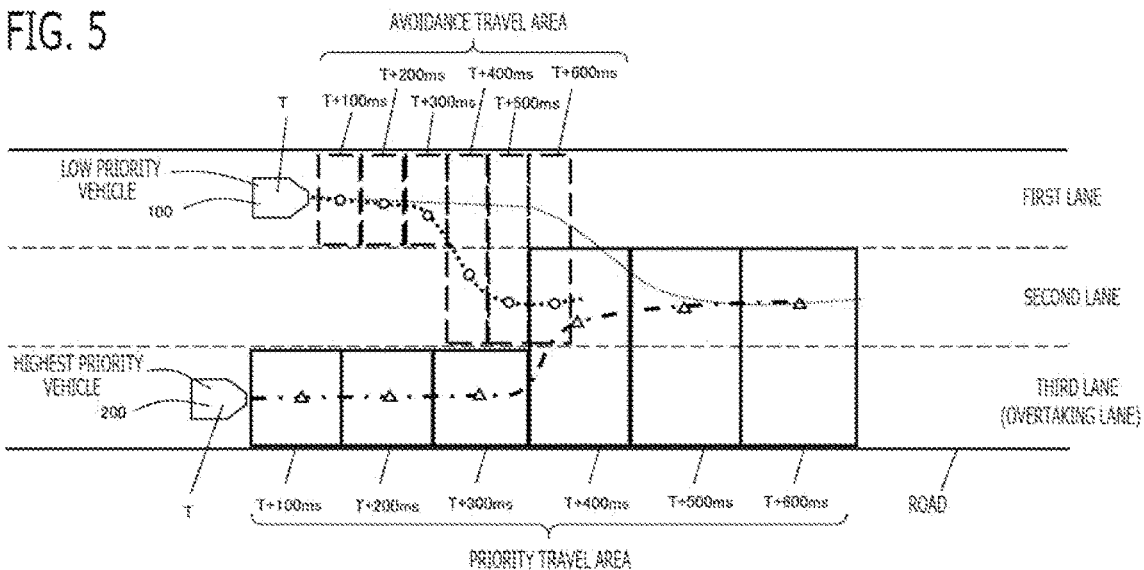
FIG. 5 is a schematic diagram for explaining determination of travel area of first case according to Embodiment 1.

For example, in the example of FIG. 4, as described above, since the priority of the second vehicle 200 is higher than the priority of the first vehicle 100, the second vehicle 200 is determined as the highest priority vehicle, and the first vehicle 100 is determined as the low priority vehicle. Then, as shown in FIG. 5, the travel area determining unit 44 determines an area where the second vehicle 200 can travel along the second lane of a lane change destination and the third lane of the current traveling lane, as the priority travel area.

For example, the travel area determining unit 44 sets a lane area which has an area setting width in the forward and backward direction and a lane width, centering on a position at each time point of the target travel route of the second vehicle 200, as the priority travel area at each time point. When the set priority travel area at each time point is a traveling lane of the lane change destination, the travel area determining unit 44 expands the priority travel area at each time point in the lateral direction so that the current traveling lane is included. If a traveling of the peripheral vehicle is disturbed by expansion to the current traveling lane (for example, if the target travel route of the other vehicle whose target travel route does not overlap exists in this area expanded to the current traveling lane), expansion is not performed.

As the vehicle speed increases, the area setting width in the forward and backward direction is increased. Although the peripheral traveling state of the highest priority vehicle is considered at this determination of the priority travel area, since there is no traveling state of peripheral vehicle other than the low priority vehicle and no state of the peripheral traveling road which should be especially considered, setting is done as mentioned above.

Since the priority travel area is set in this way, the highest priority vehicle can carry out the lane change preferentially and travel according to the initial target travel route, without possibility of contact to other vehicles. Even when it becomes impossible to carry out the lane change due to some factors, such as occurrence of an obstacle, since the current traveling lane is also included in the priority travel area, the highest priority vehicle can also travel the current traveling lane preferentially without possibility of contact to other vehicles. Accordingly, the highest priority vehicle can travel safely according to the initial target travel route, and the highest priority vehicle can travel safely and appropriately with flexibility within the priority travel area including the current traveling lane and the traveling lane of the lane change destination, while considering the peripheral traveling state that the highest priority vehicle recognized.

Like the example of FIG. 4, when a mutual overlapping of the target travel routes occurs accompanied with a lane change of the low priority vehicle, the travel area determining unit 44 determines, as the avoidance travel area, an area where the low priority vehicle can carry out a lane change while avoiding the priority travel area of the highest priority vehicle by performing acceleration or deceleration.

As shown in FIG. 5 by a thick dotted line, if the first vehicle 100 which is the low priority vehicle decelerates, it can carry out a lane change behind the second vehicle 200. Accordingly, as shown in FIG. 5 by the thick dotted line, the travel area determining unit 44 determines an avoidance travel route of time series which makes the first vehicle 100 decelerate and carry out a lane change behind the priority travel area; and sets a lane area which has an area setting width in the forward and backward direction and the lane width, centering on a position at each time point of the avoidance travel route, as the avoidance travel area at each time point. In this case, when the set avoidance travel area at each time point is a traveling lane of the lane change destination, the travel area determining unit 44 expands the avoidance travel area at each time point in the lateral direction so that the current traveling lane is included. If a traveling of the peripheral vehicle is disturbed by expansion to the current traveling lane (for example, if the target travel route of the other vehicle whose target travel route does not overlap exists in this area expanded to the current traveling lane), expansion is not performed.

Although the peripheral traveling state of the low priority vehicle is considered at this determination of the avoidance travel area, since there is no traveling state of peripheral vehicle other than the highest priority vehicle and no state of the peripheral traveling road which should be especially considered, setting is done as mentioned above. For example, when the vehicle speed of the highest priority vehicle is low, the travel area determining unit 44 may determine an avoidance travel route which makes the low priority vehicle accelerate and carry out a lane change in front of the priority travel area.

Since the avoidance travel area is set in this way, the low priority vehicle transfers route to the highest priority vehicle, and can carry out a lane change and travel while avoiding contact with the highest priority vehicle. Even when it becomes impossible to carry out the lane change due to some factors, such as occurrence of an obstacle, since the current traveling lane is also included in the avoidance travel area, the low priority vehicle can also travel the current traveling lane without possibility of contact to the highest priority vehicle. Accordingly, the low priority vehicle can avoid contact with the highest priority vehicle and carry out a lane change safely, and the low priority vehicle can travel safely and appropriately with flexibility within the avoidance travel area including the current traveling lane and the traveling lane of the lane change destination, while considering the peripheral traveling state that the low priority vehicle recognized.

<Second Case>

Next, in the situation of FIG. 4, a setting example different from the avoidance travel area shown in FIG. 5 will be shown. That is to say, when a mutual overlapping of the target travel routes occurs accompanied with a lane change of the low priority vehicle, the travel area determining unit 44 determines an area where the low priority vehicle can travel along the current traveling lane while avoiding the priority travel area, as the avoidance travel area.

Figure 6:
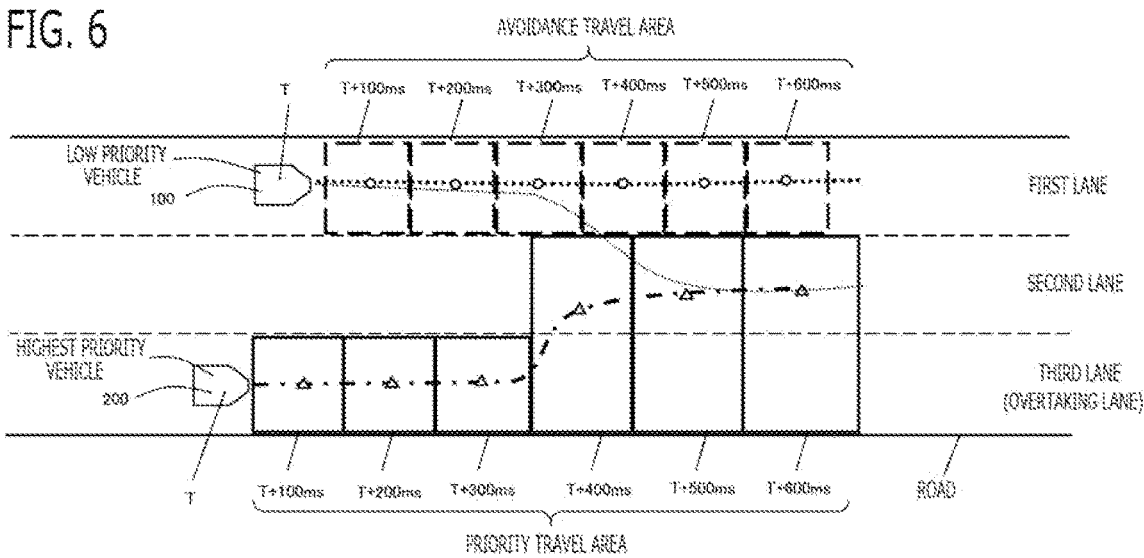
FIG. 6 is a schematic diagram for explaining determination of travel area of second case according to Embodiment 1.

For example, as shown in FIG. 6, the travel area determining unit 44 sets, as the avoidance travel area at each time point, a lane area which has an area setting width in the forward and backward direction and a lane width, centering on a position at each time point when traveling the current traveling lane with the vehicle speed at each time point of the target travel route of the first vehicle 100 which is the low priority vehicle or the current vehicle speed. Although the peripheral traveling state of the low priority vehicle is considered at this determination of the avoidance travel area, since there is no traveling state of peripheral vehicle other than the highest priority vehicle and no state of the peripheral traveling road which should be especially considered, setting is done as mentioned above.

Since the avoidance travel area is set in this way, by traveling the current traveling lane, the low priority vehicle transfers route to the highest priority vehicle, and can carry out a lane change and travel while avoiding contact with the highest priority vehicle. The low priority vehicle can travel safely and appropriately within the avoidance travel area with flexibility such as performing deceleration or acceleration.

<Third Case>

Figure 7:
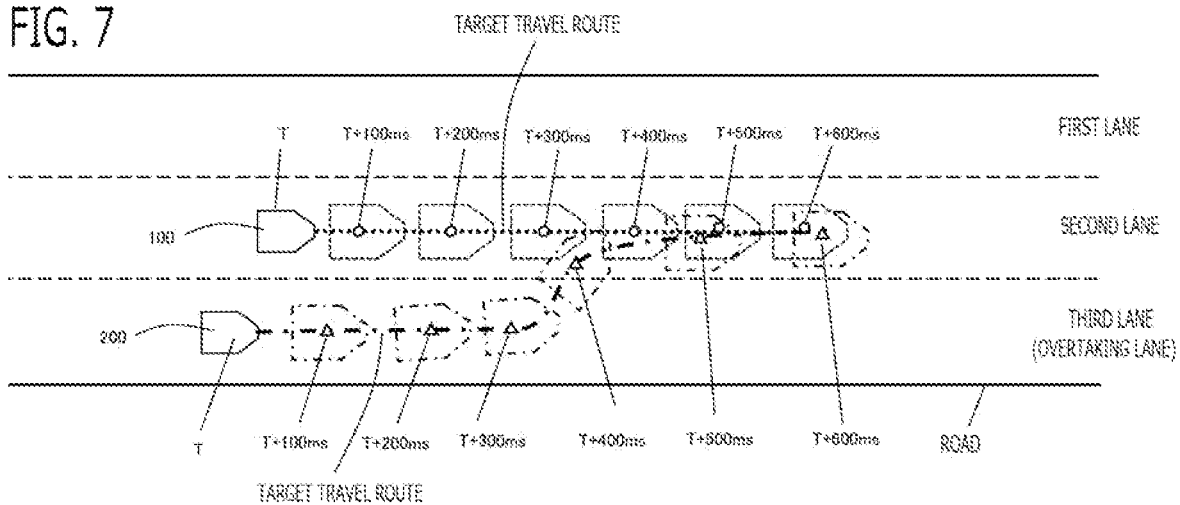
FIG. 7 is a schematic diagram for explaining determination of travel area of third case according to Embodiment 1.
Figure 8:
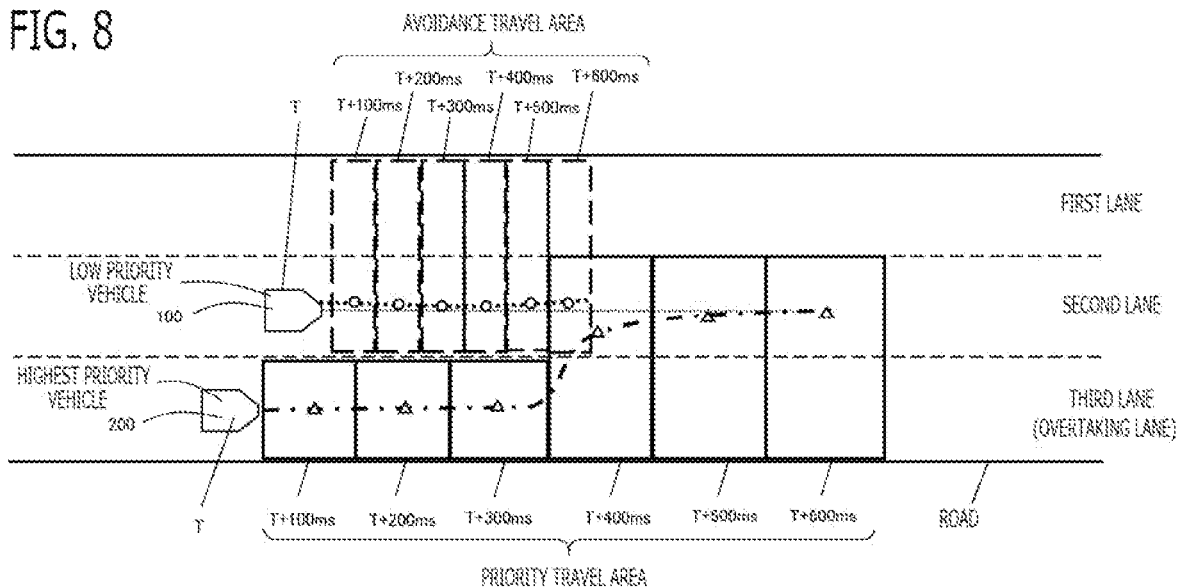
FIG. 8 is a schematic diagram for explaining determination of travel area of third case according to Embodiment 1.

Next, the third case will be explained using FIG. 7 and FIG. 8. FIG. 7 shows the received target travel routes of the first vehicle 100 and the second vehicle 200. FIG. 8 shows the priority travel area and the avoidance travel area after determination of the travel area determining unit 44. In FIG. 7, the target travel route of the second vehicle 200 is starting a lane change 300 ms after the current time T (T+300 ms), and the target travel route of the first vehicle 100 is maintaining the current traveling lane. Then, the position of the first vehicle 100 and the position of the second vehicle 200 overlap with each other from 400 ms (T+400 ms) to 600 ms (T+600 ms) after the current time T accompanied with the lane change by the second vehicle 200.

In the example of FIG. 7, similarly to the case of FIG. 4, since the first vehicle 100 has a total of 4 evaluation points, and the second vehicle 200 has a total of 8 evaluation points, the priority of the second vehicle 200 is higher than the priority of the first vehicle 100. Therefore, the second vehicle 200 is determined as the highest priority vehicle, and the first vehicle 100 is determined as the low priority vehicle.

As shown in FIG. 8, since the priority travel area of the second vehicle 200 which is the highest priority vehicle is set similarly to FIG. 5 and FIG. 6, explanation is omitted. On the other hand, the travel area determining unit 44 determines an area where the low priority vehicle can travel while avoiding the priority travel area by performing deceleration or acceleration, as the avoidance travel area.

For example, as shown in FIG. 8 by a thick dotted line, the travel area determining unit 44 determines an avoidance travel route of time series which makes the first vehicle 100 decelerate and travel behind the priority travel area in the current traveling lane; and sets a lane area which has the area setting width in the forward and backward direction and the lane width, centering on a position at each time point of the avoidance travel route, as the avoidance travel area at each time point. In this case, the travel area determining unit 44 expands the avoidance travel area at each time point to the first lane in the lateral direction. If a traveling of the peripheral vehicle is disturbed by expansion to the first lane (for example, if the target travel route of the other vehicle whose target travel route does not overlap exists in this area expanded to the first lane), expansion is not performed. Although expansion to the third lane is not performed since the third lane is a lane where the highest priority vehicle travels, it may be expanded after the highest priority vehicle passes forward.

By decelerating and traveling the current traveling lane, the low priority vehicle transfers route to the highest priority vehicle, and can carry out a lane change and travel while avoiding contact with the highest priority vehicle. And, the low priority vehicle can travel safely and appropriately within the avoidance travel area while adjusting speed in accordance with characteristics of vehicle. It is also possible to perform a lane change to some factors.

<Fourth Case>

Next, in the situation of FIG. 7, a setting example different from the avoidance travel area shown in FIG. 8 will be shown. That is to say, the travel area determining unit 44 determines an area where the low priority vehicle can travel while avoiding the priority travel area by carrying out a lane change, as the avoidance travel area.

Figure 9:
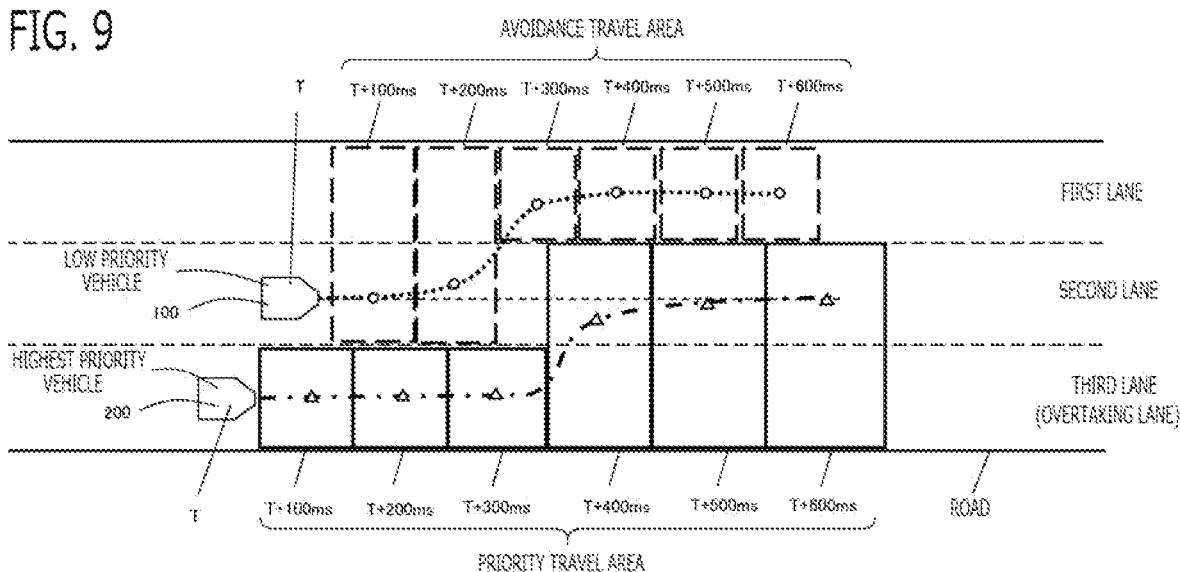
FIG. 9 is a schematic diagram for explaining determination of travel area of fourth case according to Embodiment 1.

For example, as shown in FIG. 9 by a thick dotted line, the travel area determining unit 44 determines an avoidance travel route of time series which makes the first vehicle 100 carry out a lane change and avoid the priority travel area; and sets a lane area which has the area setting width in the forward and backward direction and the lane width, centering on a position at each time point of the avoidance travel route, as the avoidance travel area at each time point. In this case, the travel area determining unit 44 considers, as the peripheral traveling state, that a lane exists on the left side which is a side opposite to the highest priority vehicle, and that other vehicle, an obstacle, and the like do not exist on its left side lane. When a left side lane does not exist, or when other vehicle and the like exist on the left side lane, the avoidance travel area which makes it decelerate or accelerate like the third case mentioned above is determined.

<Fifth Case>

When a lane change is not included in the target travel route of the highest priority vehicle, the travel area determining unit 44 determines an area where the highest priority vehicle can travel along the current traveling lane, as the priority travel area.

According to this configuration, when a lane change is not included in the target travel route of the highest priority vehicle, the highest priority vehicle can travel safely and appropriately within the priority travel area which is set along the current traveling lane, with flexibility such as performing deceleration or acceleration.

Figure 10:
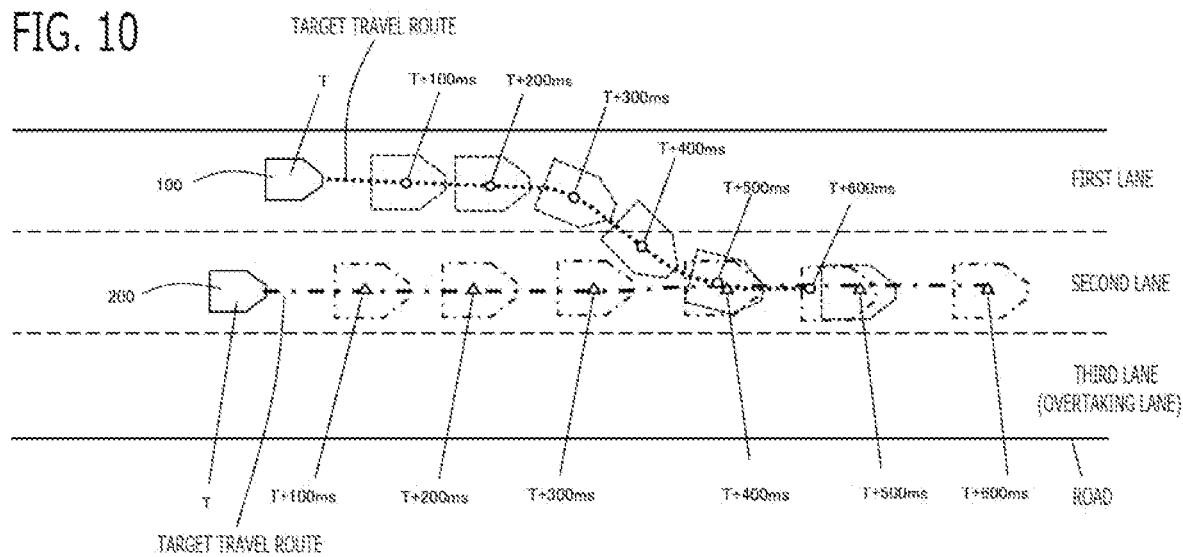
FIG. 10 is a schematic diagram for explaining determination of travel area of fifth case according to Embodiment 1.
Figure 11:
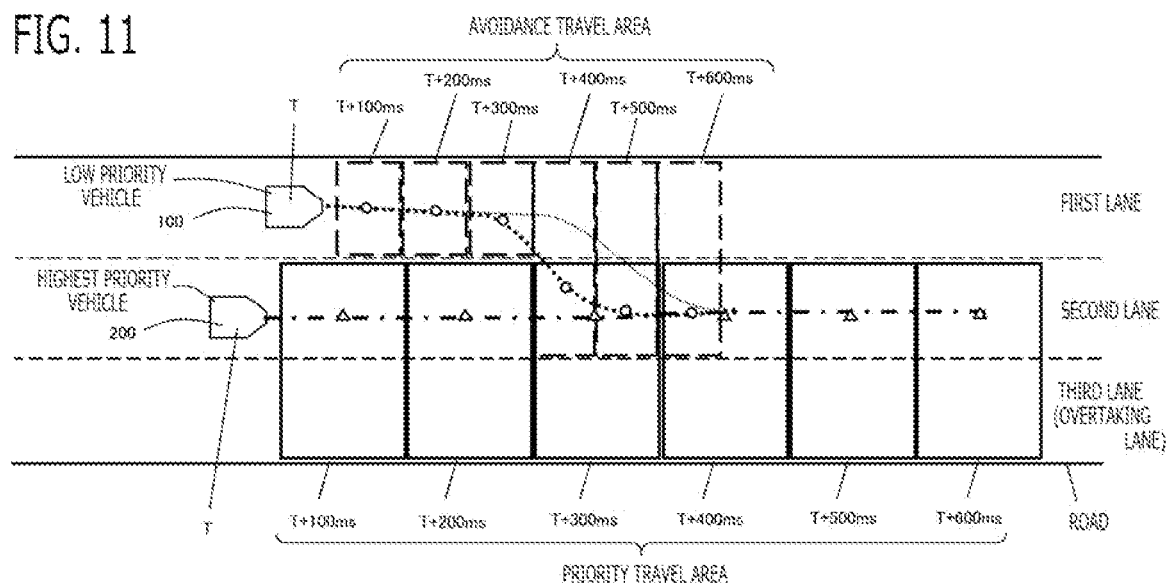
FIG. 11 is a schematic diagram for explaining determination of travel area of fifth case according to Embodiment 1.

For example, the fifth case will be explained using FIG. 10 and FIG. 11. FIG. 10 shows the received target travel routes of the first vehicle 100 and the second vehicle 200. FIG. 11 shows the priority travel area and the avoidance travel area after determination of the travel area determining unit 44. In FIG. 10, the target travel route of the first vehicle 100 is starting a lane change to the right side lane 300 ms after the current time T (T+300 ms), and the target travel route of the second vehicle 200 is maintaining the current traveling lane. Then, the position of the first vehicle 100 and the position of the second vehicle 200 overlap with each other in the vicinity of 400 ms after the current time T (T+400 ms), accompanied with the lane change by the first vehicle 100.

In the example of FIG. 10, similarly to the case of FIG. 4, since the first vehicle 100 has a total of 4 evaluation points, and the second vehicle 200 has a total of 8 evaluation points, the priority of the second vehicle 200 is higher than the priority of the first vehicle 100. Therefore, the second vehicle 200 is determined as the highest priority vehicle, and the first vehicle 100 is determined as the low priority vehicle.

Then, as shown in FIG. 11, since a lane change is not included in the target travel route of the second vehicle 200 which is the highest priority vehicle, the travel area determining unit 44 determines an area where the second vehicle 200 can travel along the second lane which is the current traveling lane, as the priority travel area. For example, the travel area determining unit 44 sets a lane area which has an area setting width in the forward and backward direction and a lane width centering on a position at each time point of the target travel route of the second vehicle 200, as the priority travel area at each time point. The travel area determining unit 44 expands the priority travel area at each time point to the third lane in the lateral direction. If a traveling of the peripheral vehicle is disturbed by expansion to the third lane (for example, if the target travel route of the other vehicle whose target travel route does not overlap exists in this area expanded to the third lane), expansion is not performed. Expansion to the first lane is not performed since the first lane is a lane where the low priority vehicle travels.

Although the peripheral traveling state of the highest priority vehicle is considered at this determination of the priority travel area, since there is no traveling state of peripheral vehicle other than the low priority vehicle and no state of the peripheral traveling road which should be especially considered, setting is done as mentioned above.

On the other hand, similarly to FIG. 5 of the first case, since the mutual overlapping of the target travel routes occurs accompanied with the lane change of the first vehicle 100 which is the low priority vehicle, the travel area determining unit 44 determines, as the avoidance travel area, an area where the low priority vehicle can carry out a lane change while avoiding the priority travel area of the highest priority vehicle by performing deceleration. Similarly to FIG. 6 of the second case, the travel area determining unit 44 may determine an area where the low priority vehicle can travel along the current traveling lane while avoiding the priority travel area, as the avoidance travel area.

<Sixth Case>

When there are a multiple of the low priority vehicles, the travel area determining unit 44 determines an area where the low priority vehicle with the lower priority can travel while avoiding the priority travel area of the highest priority vehicle and while avoiding the avoidance travel area of the low priority vehicle with the higher priority, as the avoidance travel area of the multiple of low priority vehicles.

According to this configuration, even when there are a multiple of low priority vehicles, since traveling of a vehicle with a higher priority is prioritized, a vehicle flow in a traffic system can be further smoothened, and a vehicle with a higher degree of urgency can be traveled with priority.

Figure 12:
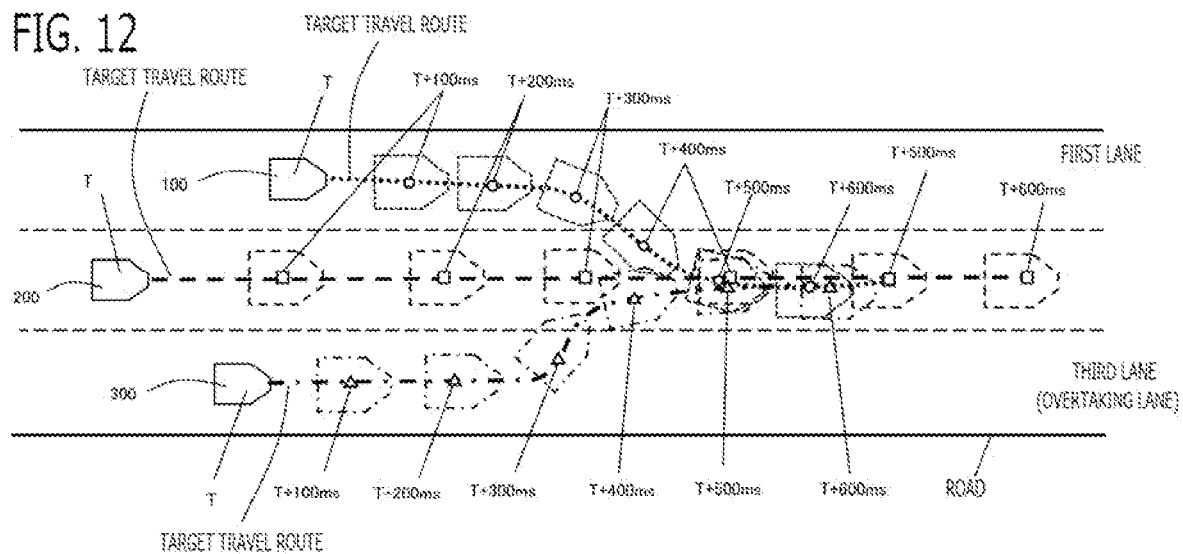
FIG. 12 is a schematic diagram for explaining determination of travel area of sixth case according to Embodiment 1.
Figure 13:
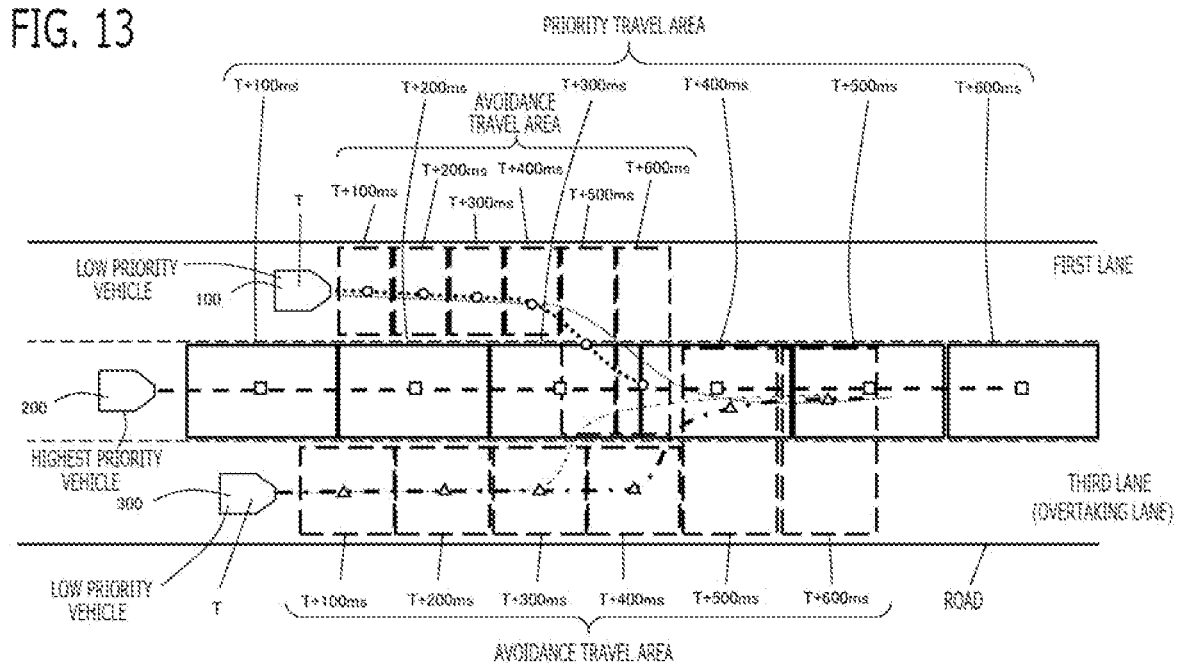
FIG. 13 is a schematic diagram for explaining determination of travel area of sixth case according to Embodiment 1.

For example, the sixth case will be explained using FIG. 12 and FIG. 13. FIG. 12 shows the received target travel routes of the first vehicle 100, the second vehicle 200, and the third vehicle 300. FIG. 13 shows the priority travel area and the avoidance travel area after determination of the travel area determining unit 44. In FIG. 12, the target travel route of the first vehicle 100 is starting a lane change to the right side lane 300 ms after the current time T (T+300 ms), the target travel route of the second vehicle 200 is maintaining the current traveling lane, and the target travel route of the third vehicle 300 is starting a lane change to the left side lane 300 ms after the current time T (T+300 ms). Then, the positions of the first vehicle 100, the second vehicle 200, and the third vehicle 300 overlap with each other 400 ms after the current time T (T+400 ms) accompanied with the lane changes by the first vehicle 100 and the third vehicle 300.

In the example of FIG. 12, since the second vehicle 200 is an emergency vehicle, rule 2 is satisfied, the evaluation points are higher than those of other coinciding vehicles, the second vehicle 200 is determined as the highest priority vehicle, and the first vehicle 100 and the third vehicle 300 are determined as the low priority vehicles. Then, since the first vehicle 100 is positioned farther forward than the third vehicle 300, rule 6 is satisfied, and 4 points are added to the evaluation points of the first vehicle 100. And, since the speed of the third vehicle 300 is higher than the speed of the first vehicle 100, rule 7 is satisfied, and 4 points are added to the evaluation points of the third vehicle 300. On the other hand, since the third vehicle 300 is traveling in the overtaking lane, rule 9 is satisfied, and 4 points are added to the evaluation points of the third vehicle 300. Therefore, since the third vehicle 300 has a total of 8 evaluation points, and the first vehicle 100 has a total of 4 evaluation points, the priority of the third vehicle 300 is higher than the priority of the first vehicle 100.

As shown in FIG. 13, similarly to the fifth case of FIG. 11, since a lane change is not included in the target travel route of the second vehicle 200 which is the highest priority vehicle, the travel area determining unit 44 determines an area where the second vehicle 200 can travel along the second lane which is the current traveling lane, as the priority travel area. For example, the travel area determining unit 44 sets a lane area which has an area setting width in the forward and backward direction and a lane width, centering on a position at each time point of the target travel route of the second vehicle 200, as the priority travel area at each time point. The travel area determining unit 44 does not expand the priority travel area at each time point to the first lane and the third lane in the lateral direction. This is because the first vehicle 100 and the third vehicle 300 are traveling in the first lane and the third lane, and traveling of these peripheral vehicles are disturbed.

Next, the travel area determining unit 44 determines the avoidance travel route of the third vehicle 300 whose priority is higher than the first vehicle 100, among the low priority vehicles. Since the mutual overlapping of the target travel routes occurs accompanied with the lane change of the third vehicle 300, the travel area determining unit 44 determines, as the avoidance travel area, an area where the third vehicle 300 can carry out a lane change while avoiding the priority travel area by delaying timing of the lane change.

As shown in FIG. 13 by a thick dashed dotted line, the travel area determining unit 44 determines an avoidance travel route of time series which makes the third vehicle 300 delay timing of the lane change and carry out the lane change behind the priority travel area; and sets a lane area which has the area setting width in the forward and backward direction and the lane width centering on a position at each time point of the avoidance travel route, as the avoidance travel area at each time point. In this case, when the set avoidance travel area at each time point is a traveling lane of the lane change destination, the travel area determining unit 44 expands the avoidance travel area at each time point in the lateral direction so that the current traveling lane is included. If a traveling of the peripheral vehicle is disturbed by expansion to the current traveling lane (for example, if the target travel route of the other vehicle whose target travel route does not overlap exists in this area expanded to the current traveling lane), expansion is not performed.

Then, in order to make the first vehicle 100 whose priority is lower than the third vehicle 300 carryout a lane change while avoiding the priority travel area of the second vehicle 200 and the avoidance travel area of the third vehicle 300, the travel area determining unit 44 determines an area where the first vehicle 100 can carry out a lane change while avoiding the priority travel area of the second vehicle 200 and the avoidance travel area of the third vehicle 300 by performing deceleration. As shown in FIG. 13 by a thick dotted line, the travel area determining unit 44 determines an avoidance travel route of time series which makes the first vehicle 100 decelerate and carry out a lane change behind the priority travel area of the second vehicle 200 and the avoidance travel area of the third vehicle 300; and sets a lane area which has the area setting width in the forward and backward direction and the lane width, centering on a position at each time point of the avoidance travel route, as the avoidance travel area at each time point. In this case, when the set avoidance travel area at each time point is a traveling lane of the lane change destination, the travel area determining unit 44 expands the avoidance travel area at each time point in the lateral direction so that the current traveling lane is included. If a traveling of the peripheral vehicle is disturbed by expansion to the current traveling lane (for example, if the target travel route of the other vehicle whose target travel route does not overlap exists in this area expanded to the current traveling lane), expansion is not performed.

<Example of Hardware Configuration of Route Arbitration Apparatus 1>

Figure 14:
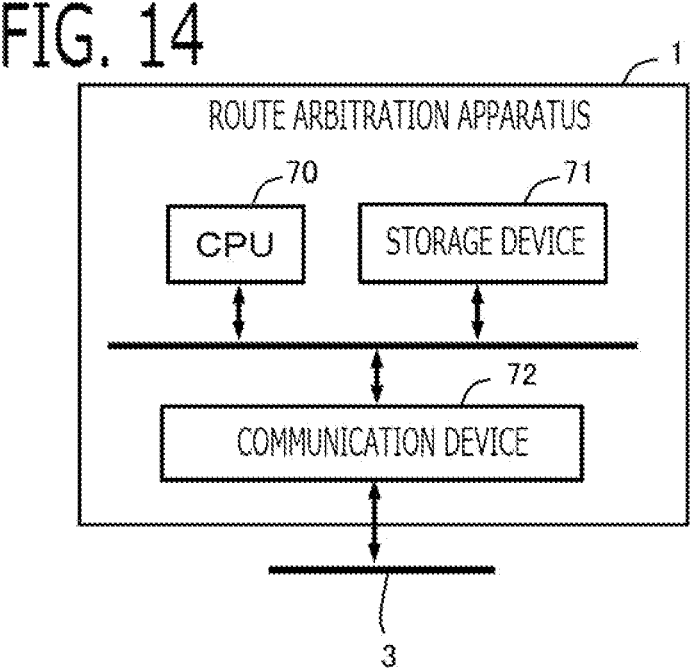
FIG. 14 is a hardware configuration figure of the route arbitration apparatus according to Embodiment 1.

Each function of the route arbitration apparatus 1 is realized by processing circuits provided in the route arbitration apparatus 1. As shown in FIG. 14, the route arbitration apparatus 1 is provided with an arithmetic processor 70 (computer) such as a CPU (Central Processing Unit), storage devices 71 such as a RAM (Random Access Memory), a ROM (Read Only Memory), and a hard disk (HDD), an communication device 72 which performs data communication, and the like. The communication device 72 is connected to the network 3, and carries out wired data communication.

A program for each function, high accuracy map data, and the like are stored in the storage device 71, such as the hard disk, of the route arbitration apparatus 1. Each processing of the route arbitration apparatus 1 is realized by the arithmetic processing processor 70 executing a program (software) stored in the storage device 71, and collaborating with other hardware devices such as the storage device 71 and the communication device 72.

<Flowchart of Route Arbitration Apparatus 1>

Figure 15:
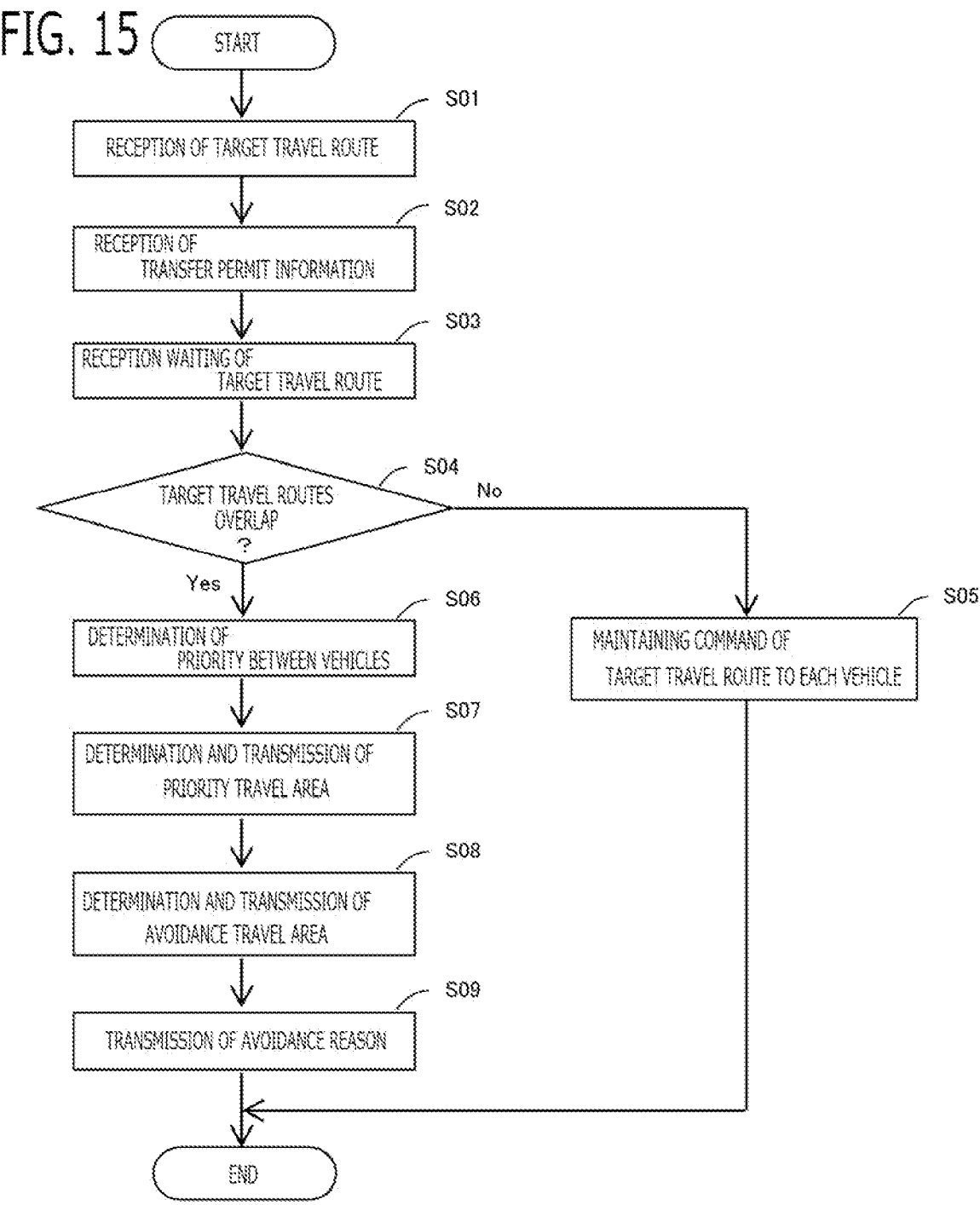
FIG. 15 is a flowchart for explaining the processing of the route arbitration apparatus according to Embodiment 1.

Next, processing of the route arbitration apparatus 1 will be explained using the flowchart of FIG. 15. Processing of the flowchart of FIG. 15 is executed repeatedly every constant calculation period, for example.

In the step S01, as mentioned above, the target route receiving unit 41 receives a target travel route from each vehicle via the communication unit 40. And, in the step S02, the transfer information receiving unit 47 receives transfer permission information from each vehicle. In the step S03, as mentioned above, the determination delay unit 48 makes the determination of the route overlapping determining unit 42 delay, until the target travel routes are received from respective vehicles.

In the step S04, as mentioned above, the route overlapping determining unit 42 determines whether or not the received target travel routes of respective vehicles overlap with each other. When determining that it is overlapping, it advances to the step S06, and when determining that it is not overlapping, it advances to the step S05. In the step S05, the travel area determining unit 44 transmits a command to maintain the target travel route to each vehicle via the communication unit 40.

On the other hand, in the step S06, as mentioned above, the priority determining unit 43 determines priority between vehicles. Then, in the step S07, as mentioned above, the travel area determining unit 44 determines a priority travel area which is an area where the highest priority vehicle which is a vehicle with the highest priority among the overlapping vehicles whose target traveling routes were determined to overlap mutually can travel in accordance with the target traveling route of the highest priority vehicle. Then, the travel area transmitting unit 45 transmits the priority travel area to the highest priority vehicle via the communication unit 40, and makes the highest priority vehicle travel within the priority travel area.

In the step S08, as mentioned above, the travel area determining unit 44 determines an avoidance travel area which is an area where a low priority vehicle which is a vehicle other than the highest priority vehicle among the overlapping vehicles can travel while avoiding the priority travel area. Then, the travel area transmitting unit 45 transmits the avoidance travel area to the low priority vehicle via the communication unit 40, and makes the low priority vehicle travel within the avoidance travel area.

In the step S09, the avoidance reason transmitting unit 46 transmits an avoidance reason that the avoidance travel area is determined, to the low priority vehicle in which the avoidance travel area is determined by the travel area determining unit 44.

1-2. Configuration of Vehicle

Figure 16:
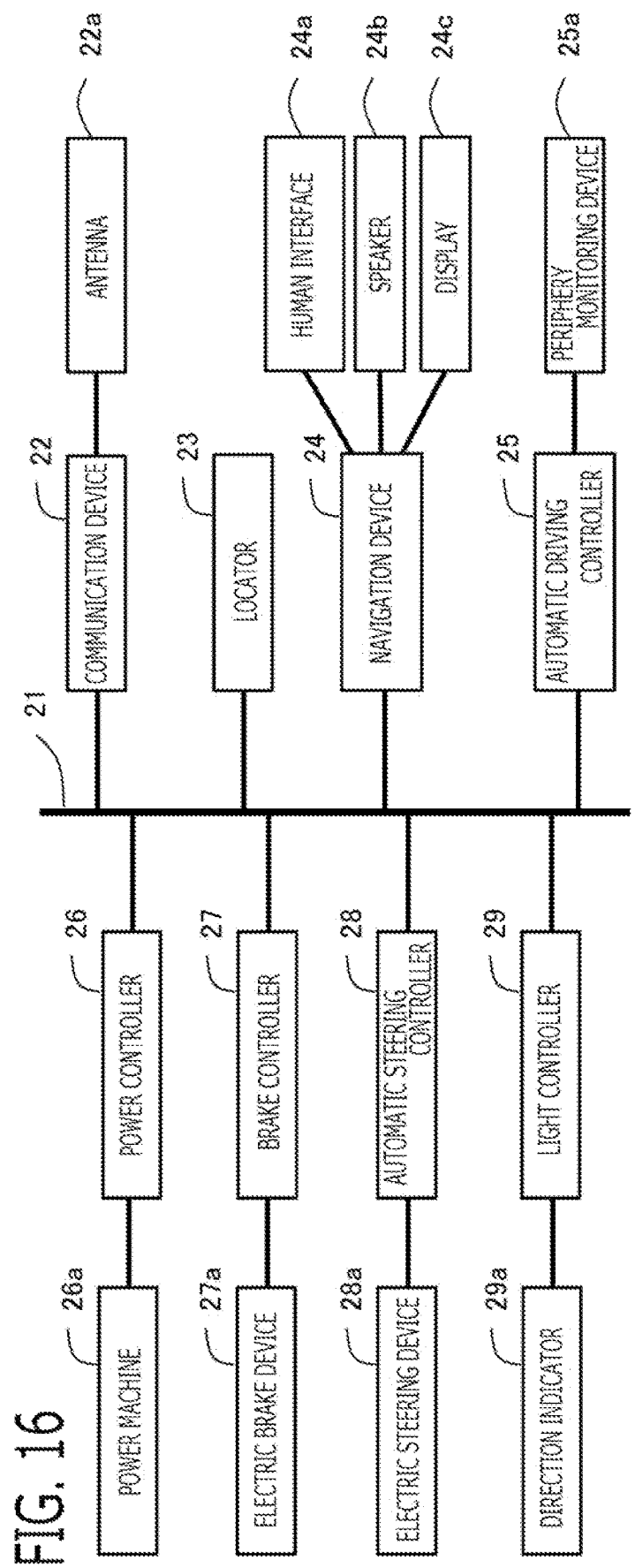
FIG. 16 is a schematic configuration diagram of the vehicle system according to Embodiment 1.

FIG. 16 shows a schematic configuration of a system mounted in each vehicle 20. Each vehicle 20 includes a vehicle-mounted network 21, a communication device 22, a locator 23, a navigation device 24, an automatic driving controller 25, a power controller 26, a brake controller 27, an automatic steering controller 28, alight controller 29, and the like.

The vehicle-mounted network 21 is a network that carries out reciprocal communication among the vehicle-mounted devices 22 to 29. For example, a communications standard such as a CAN (controller area network), Ethernet, or FlexRay (both registered trademarks) is used.

The communication device 22 is a communication device that carries out wireless communication with the base station 4 existing within a communication area using an antenna 22a, and carries out a communication of data with the route arbitration apparatus 1. Also, the communication device 22 may communicate with a nearby vehicle.

The locator 23 is a device that recognizes a position of the own vehicle, and has a GPS antenna, an acceleration sensor, a direction sensor, and the like. The locator 23 matches own vehicle positional information (latitude, longitude, altitude) obtained from the GPS antenna or the like, information obtained from a periphery monitoring device 25a, and the like, and high accuracy map data, thereby recognizing highly accurate own vehicle positional information.

The navigation device 24 determines a target route from the current position to the target point, based on the current position of the own vehicle obtained from the locator 23, the target point, the map data, and the road state. The navigation device 24 includes a human interface 24a, and receives a setting of a target point by a vehicle occupant. The navigation device 24 can output navigation-related information to a speaker 24b and a display 24c, thereby providing the information to the vehicle occupant.

Figure 17:
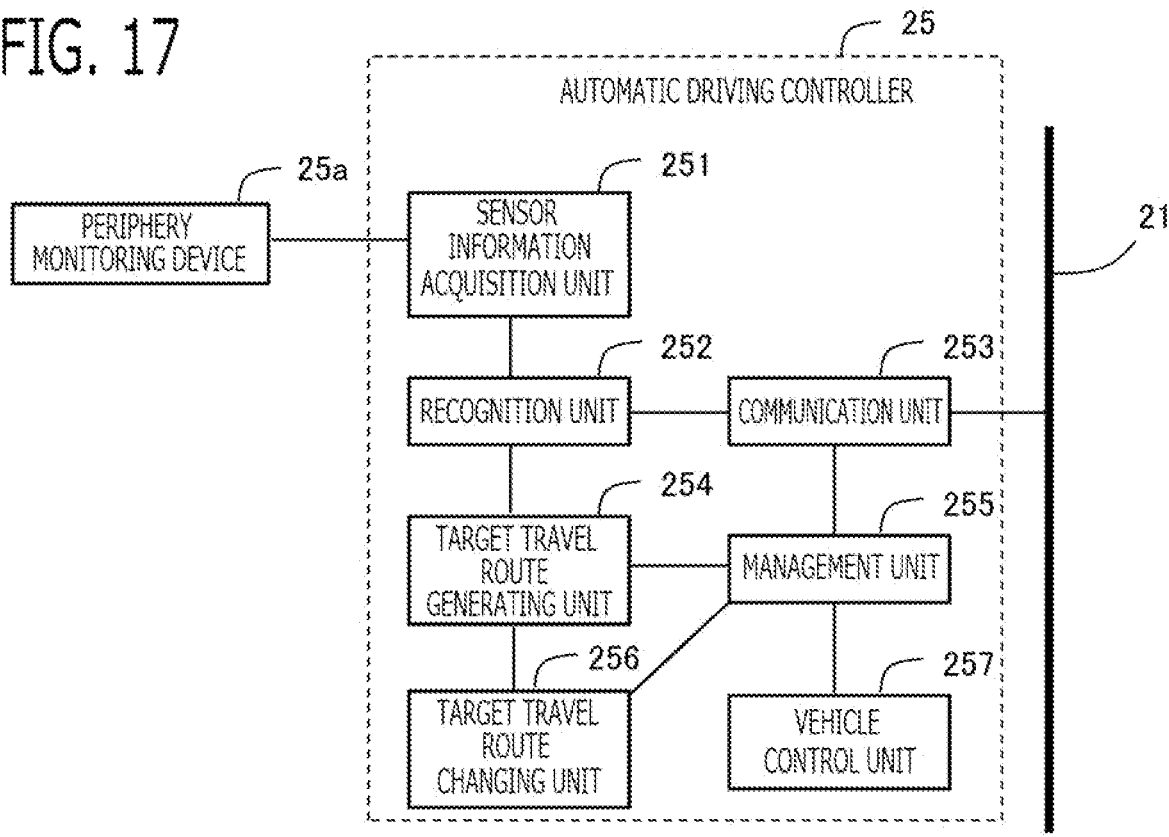
FIG. 17 is a schematic configuration diagram of the automatic driving controller according to the first embodiment.

The automatic driving controller 25 is a device that carries out recognition, evaluation, and control for automatic driving. As shown in FIG. 17, the automatic driving controller 25 is provided with a sensor information acquisition unit 251, a recognition unit 252, a communication unit 253, a target travel route generation unit 254, a management unit 255, a target travel route changing unit 256, a vehicle control unit 257, and the like.

The communication unit 253 communicates with other vehicle-mounted device via the vehicle-mounted network 21. The sensor information acquisition unit 251 acquires information from the periphery monitoring device 25a. The periphery monitoring device 25a is a camera, a radar, and the like, that monitors the periphery of the own vehicle. As the radar, a millimeter wave radar, a laser radar, an ultrasonic radar, and the like are used.

<Recognition Unit 252>

The recognition unit 252 recognizes a peripheral traveling state of the own vehicle. In the present embodiment, the recognition unit 252 recognizes a peripheral traveling state such as a traveling state of a peripheral vehicle and a state of a traveling road, based on the own vehicle positional information, the high accuracy map data, and the peripheral information obtained from the periphery monitoring device 25a. As the traveling state of the peripheral vehicle, a position, a speed, a traveling direction, a traveling lane, a size, a category, and the like of the peripheral vehicle are recognized. As the state of the traveling road, a road form, a lane, an existence or nonexistence of an obstacle, an existence or nonexistence of a pedestrian, road sign information, a road traffic rule such as a section in which a lane change is prohibited, signal information, traffic jam information, and the like are recognized.

<Target Travel Route Generation Unit 254>

Then, the target travel route generation unit 254 determines a target travel route where the own vehicle travels, considering the peripheral traveling state of the own vehicle. In the present embodiment, the target travel route generating unit 254 determines a short distance target travel route for traveling along the target route to the target point set by the navigation device 24 in accordance with the recognized peripheral travel state. The short distance target travel route is a target travel route from the current point to a point a predetermined distance forward or until a predetermined time ahead. How far in the future the target travel route is determined is arbitrary, but as an example, a target travel route within a range corresponding to a range that can be detected by the periphery monitoring device 25a is determined.

For example, when other vehicle, an obstacle, a pedestrian, or the like is detected ahead of the own vehicle by the periphery monitoring device 25a, the target travel route generating unit 254 determines the target travel route that contact with the other vehicle, the obstacle, the pedestrian, or the like is avoided. And, when a road form different from the high accuracy map data is recognized by the periphery monitoring device 25a, the target travel route generating unit 254 determines the target travel route that is in accordance with the recognized road form. And, when sign information or signal information is recognized by the periphery monitoring device 25a, the target travel route generating unit 254 determines the target travel route that is in accordance with the recognized sign information or signal information. Also, when there is no need to change the target route set by the navigation device 24, the target travel route generating unit 254 determines the target travel route that is in accordance with the travel route of the navigation device 24. The target travel route is a travel plan of time series for a vehicle position, a vehicle traveling direction, a vehicle speed, a traveling lane, a position where a lane change is carried out, and the like, at each time in the future.

<Management Unit 255>

The management unit 255 transmits a determined target travel route to the route arbitration apparatus 1 via the communication device 22. For example, the management unit 255 transmits, as target travel route data, time series data such as the vehicle position (latitude, longitude, altitude), the vehicle speed, and the vehicle orientation at each time. As mentioned above, the example of the time series data of the target travel route is shown in FIG. 3. In the example of FIG. 3, the time series data is formed of a time, a latitude, a longitude, a vehicle speed, and a vehicle orientation (for example, an azimuth of the forward and backward direction of the vehicle).

Basic information of vehicle is included in the target travel route data to be transmitted. As basic information, there is a vehicle category (for example, an ambulance, a police car, a route bus, a cargo vehicle, a taxi, a general passenger car, a two-wheeled motorbike), a vehicle outline form, vehicle information (for example, a vehicle performance, a vehicle state, a number of occupants), and information relating to a degree of urgency of the vehicle.

And, when a transfer permission stating that the travel route may be transferred to other vehicle is set, the management unit 255 transmits transfer permission information to the route arbitration apparatus 1 together with target travel route data. Transfer permission is set by an occupant via the human interface 24a or the like, or set as default in the vehicle.

And, the management unit 255 may transmit a waiting time that the determination delay unit 48 of the route arbitration apparatus 1 described later waits for a reception of a target travel route, to the route arbitration apparatus 1 together with target travel route data. For example, the waiting time transmitted by the management unit 255 is set to a difference between a time farthest in the future at which the target travel route will be traveled and the current time.

As mentioned above, the route arbitration apparatus 1 determines whether or not the received target travel routes of respective vehicles overlap with each other; determines the priority travel area which is an area where the highest priority vehicle can travel in accordance with the target travel route, and the avoidance travel area which is an area where the low priority vehicle can travel while avoiding the priority travel area, considering the priority between vehicles determined to be overlapped; and transmits the priority travel area to the highest priority vehicle and transmits the avoidance travel area to the low priority vehicle.

When the route arbitration apparatus 1 determined the own vehicle as the highest priority vehicle and transmits the priority travel area to the own vehicle, the management unit 255 receives the priority travel area transmitted from the route arbitration apparatus 1. When the route arbitration apparatus 1 determined the own vehicle as the low priority vehicle and transmits the avoidance travel area to the own vehicle, the management unit 255 receives the avoidance travel area transmitted from the route arbitration apparatus 1.

When the management unit 255 receives an avoidance reason that the avoidance travel area is determined, from the route arbitration apparatus 1, the management unit 255 informs the avoidance reason to the occupant via the communication unit 253 and the navigation device 24 using one or both of the speaker 24b and the display 24c.

<Target Travel Route Changing Unit 256>

When the priority travel area or the avoidance travel area was received, the target travel route changing unit 256 changes the target travel route considering the peripheral traveling state of the own vehicle so that the target travel route of the own vehicle becomes within the priority travel area or the avoidance travel area.

Figure 18:
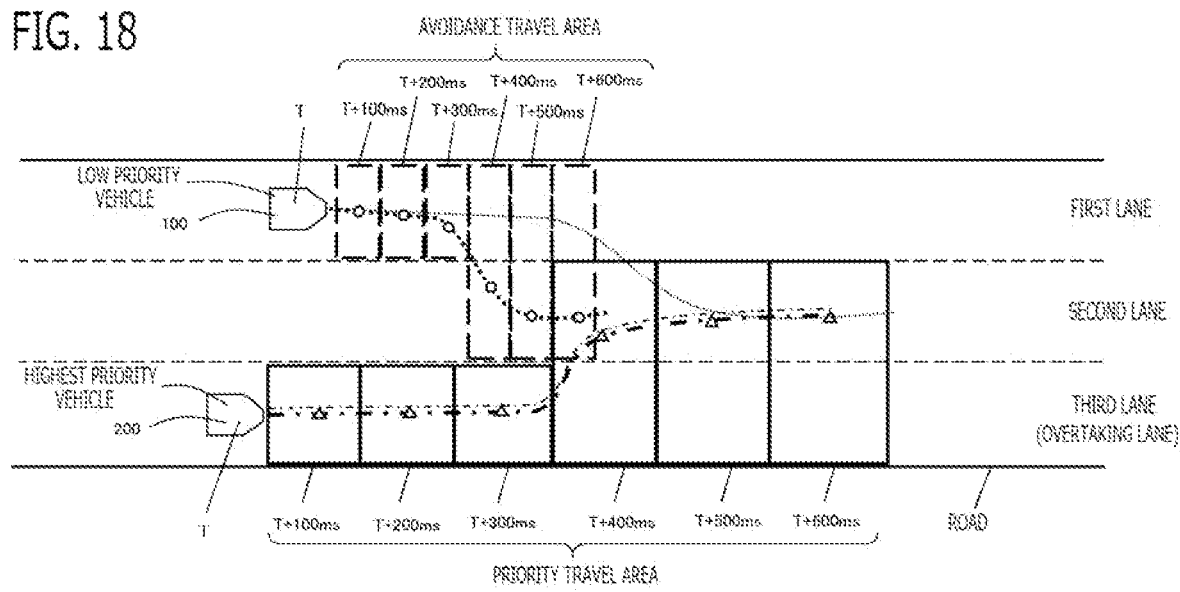
FIG. 18 is a schematic diagram for explaining the determination of the target travel route which becomes within the travel area according to the first embodiment.

The case where the priority travel area and the avoidance travel area of FIG. 5 were received will be explained as an example. As shown in FIG. 18, since the transmitted target travel route is within the received priority travel area as shown in FIG. 18 by a thin dashed dotted line, and it is not necessary to change from the transmitted target travel route even if considering the current peripheral traveling state of the own vehicle, the target travel route changing unit 256 of the second vehicle 200 which is the highest priority vehicle determines a target travel route similar to the transmitted target travel route, as shown in FIG. 18 by a thick dashed dotted line.

On the other hand, since the transmitted target travel route which is shown in FIG. 18 by a thin dotted line is not within the received avoidance travel area, the target travel route changing unit 256 of the first vehicle 100 which is the low priority vehicle changes the target travel route so as to be within the avoidance travel area, considering the current peripheral traveling state of the own vehicle, as shown by a thick dotted line. Specifically, the target travel route changing unit 256 changes into a target travel route which decelerates the first vehicle 100 and carries out a lane change.

Figure 19:
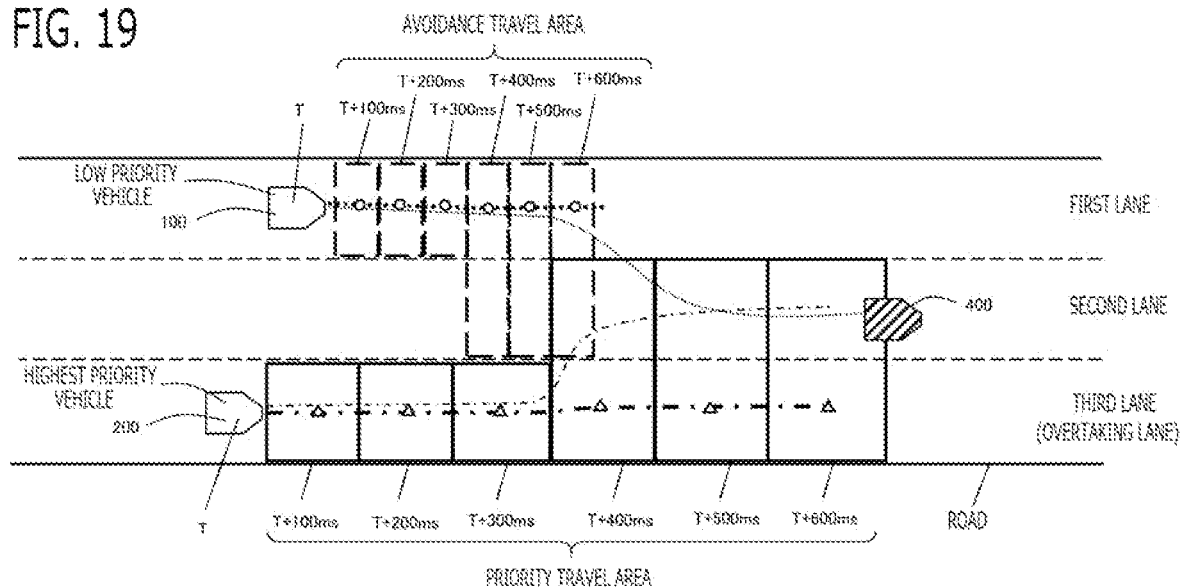
FIG. 19 is a schematic diagram for explaining the determination of the target travel route which becomes within the travel area according to the first embodiment.

FIG. 19 shows a different example. The recognition units 252 of the first vehicle 100 and the second vehicle 200 newly recognize a broken down vehicle 400 before and after receiving the priority travel area or the avoidance travel area. Accordingly, although the transmitted target travel route is within the received priority travel area as shown in FIG. 19 by a thin dashed dotted line, the target travel route changing unit 256 of the second vehicle 200 which is the highest priority vehicle changes into a target travel route which avoids the broken down vehicle 400 within the priority travel area, considering the newly recognized broken down vehicle 400, as shown in FIG. 19 by a thick dashed dotted line. Specifically, since the priority travel area is expanded not only to the traveling lane of the lane change destination but also to the current traveling lane, the target travel route changing unit 256 changed into a target travel route which maintains the third lane which is the current traveling lane in order to avoid the broken down vehicle 400 which exists in the second lane.

On the other hand, since the transmitted target travel route which is shown in FIG. 19 by a thin dotted line is not within the received avoidance travel area, the target travel route changing unit 256 of the first vehicle 100 which is the low priority vehicle changes the target travel route so as to be within the avoidance travel area, considering the newly recognized broken down vehicle 400, as shown by a thick dotted line. Specifically, since the avoidance travel area is expanded not only to the traveling lane of the lane change destination but also to the current traveling lane, the target travel route changing unit 256 changed into a target travel route which maintains the first lane which is the current traveling lane in order to avoid the broken down vehicle 400 which exists in the second lane.

In this way, since the travel route is not transmitted to each vehicle from the route arbitration apparatus 1 but the travel area where each vehicle can travel is transmitted, each vehicle can travel safely and appropriately within the travel area with flexibility, considering the peripheral traveling state that each vehicle recognized.

<Vehicle Control Unit 257>

When the target travel route changing unit 256 changes the target travel route, the management unit 255 transmits the target travel route after change to the vehicle control unit 257. When the target travel route changing unit 256 does not change the target travel route, the management unit 255 transmits the target travel route generated by the target travel route generation unit 254 to the vehicle control unit 257.

The vehicle control unit 257 makes the own vehicle travel along with the target travel route transmitted from the management unit 255. In the present embodiment, the vehicle control unit 257 determines a target speed, a target steering angle, an operation command of the direction indicator, and the like, in order to travel along the target travel route; commands the target speed to the power controller 26 and the brake controller 27; commands the target steering angle to the automatic driving controller 28; and commands the operation command of the direction indicator to the light controller 29.

The power controller 26 controls an output of the power machine 26a, such as an internal combustion engine or a motor, so that the speed of the own vehicle follows the target speed. The brake controller 27 controls a braking operation of the electric brake device 27a so that the speed of the own vehicle follows the target speed. The automatic steering controller 28 controls the electric steering device 28a so that the steering angle follows the target steering angle. The light controller 29 controls the direction indicator 29a in accordance with the operation command of the direction indicator.

As configurations of vehicles having an automatic driving function differ, depending on a vehicle manufacturer, a configuration may differ from the configuration described in the present application. As long as a vehicle at least has functions of transmitting the target travel route to the route arbitration apparatus 1, and carrying out automatic driving within the priority travel area or the avoidance travel area transmitted from the route arbitration apparatus 1, the automatic driving and route arbitration system of the present application can be configured.

<Example of Hardware Configuration of Automatic Driving Controller 25>

Figure 20:
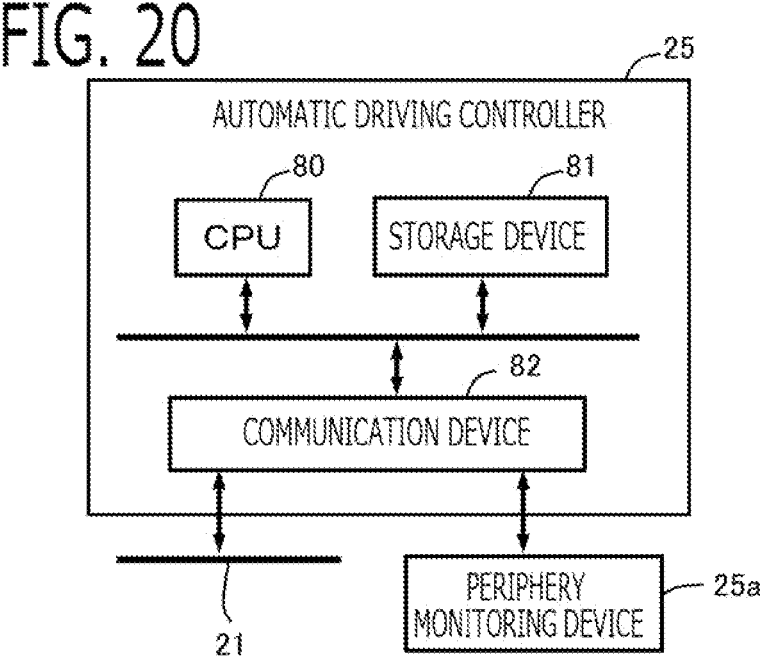
FIG. 20 is a hardware configuration diagram of the automatic driving controller according to Embodiment 1.

Each function of the automatic driving controller 25 is realized by processing circuits provided in the automatic driving controller 25. As shown in FIG. 20, the automatic driving controller 25 is provided with an arithmetic processor 80 (computer) such as a CPU (Central Processing Unit), storage devices 81 such as a RAM (Random Access Memory), a ROM (Read Only Memory), and a hard disk (HDD), an communication device 82 which performs data communication, and the like. In each embodiment, the communication device 82 is connected to the vehicle-mounted network 21, the periphery monitoring device 25a, and the like, and carries out data communication.

A program for each function and the like are stored in the storage device 81, such as the hard disk, of the automatic driving controller 25. Each processing of the automatic driving controller 25 is realized by the arithmetic processing processor 80 executing a program (software) stored in the storage device 81, and collaborating with other hardware devices such as the storage device 81 and the communication device 82.

<Flowchart of Automatic Driving Controller 25>

Figure 21:
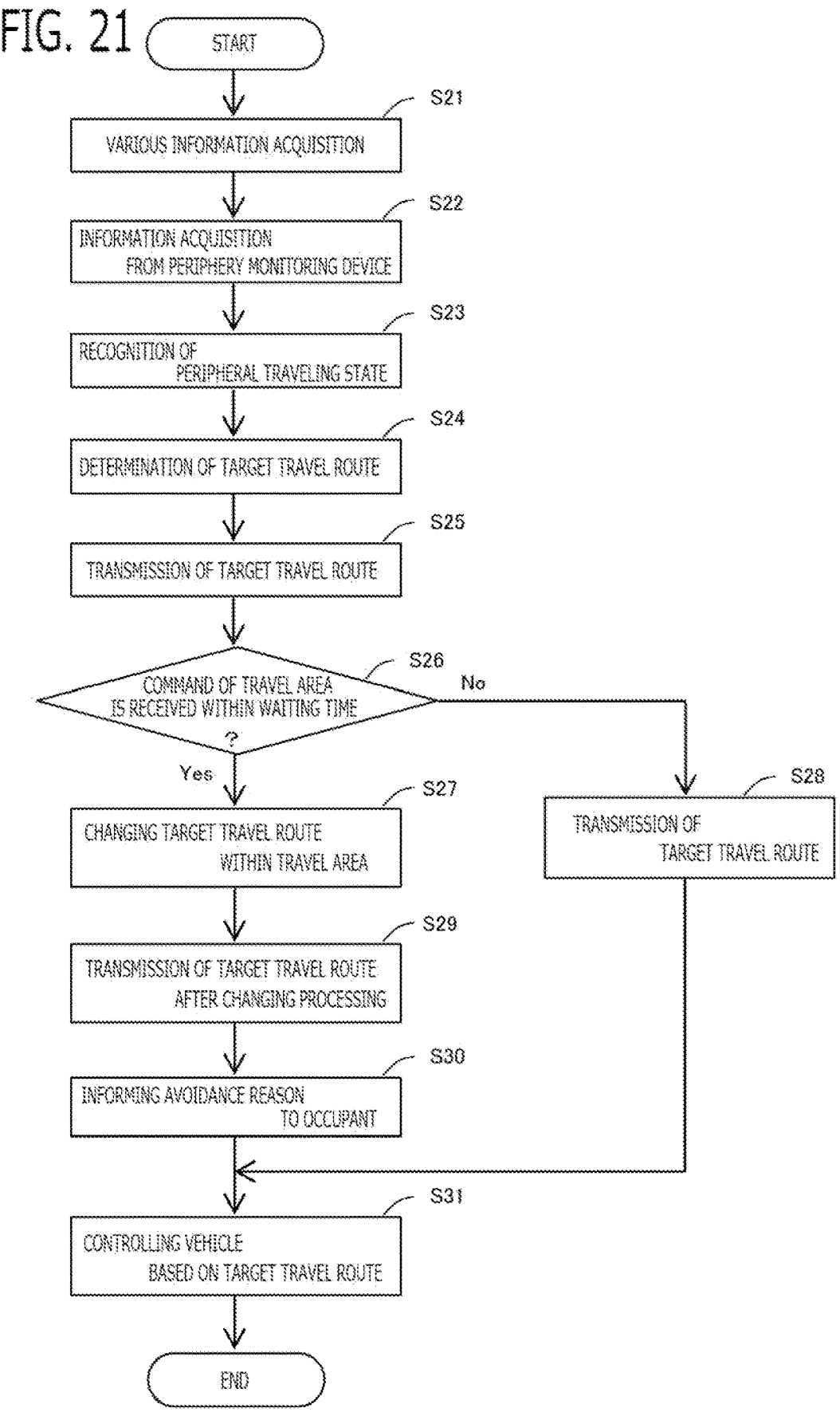
FIG. 21 is a flowchart explaining processing of the automatic driving controller according to the first embodiment.

Next, processing of the automatic driving controller 25 will be explained using the flowchart of FIG. 21. Processing of the flowchart of FIG. 21 is executed repeatedly every constant calculation period, for example.

In the step S21, as mentioned above, the communication unit 253 communicates with other vehicle-mounted device, such as the navigation device 24 or the locator 23, via the vehicle-mounted network 21, and acquires information such as the target route to the target point, the positional information of the own vehicle, and the high accuracy map data. The communication unit 253 communicates at an appropriate time and as necessary.

In the step S22, as mentioned above, the sensor information acquisition unit 251 acquires information from the periphery monitoring device 25a. In the step S23, as mentioned above, the recognition unit 252 recognizes a peripheral traveling state such as a traveling state of a peripheral vehicle and a state of a traveling road, based on the own vehicle positional information, the high accuracy map data, and the peripheral information obtained from the periphery monitoring device 25a.

In the step S24, as mentioned above, the target travel route generating unit 254 determines a short distance target travel route for traveling along the target route to the target point set by the navigation device 24, in accordance with the recognized peripheral travel state.

In the step S25, as mentioned above, the management unit 255 transmits the target travel route determined by the target travel route generation unit 254, to the route arbitration apparatus 1 via the communication unit 253 and the communication device 22. And, when transfer permission is set, the management unit 255 transmits the transfer permission information to the route arbitration apparatus 1 together with the target travel route data.

In the step S26, the management unit 255, after transmitting the target travel route, waits to receive the priority travel area or the avoidance travel area from the route arbitration apparatus 1 until a preset waiting time elapses, advances to the step S27 at the time of receiving when receiving, and advances to step S28 when not receiving despite the waiting time elapsing.

In the step S28, the management unit 255 transmits the target travel route to the vehicle control unit 257, since the time for receiving from the route arbitration apparatus 1 has expired.

In the step S27, as mentioned above, the target travel route changing unit 256 changes the target travel route considering the peripheral traveling state of the own vehicle so that the target travel route of the own vehicle becomes within the priority travel area or the avoidance travel area.

In the step S29, the management unit 255 transmits the target travel route after changing processing by the target travel route changing unit 256, to the vehicle control unit 257. And, in the step S30, when an avoidance reason that the avoidance travel area is determined is received from the route arbitration apparatus 1, the management unit 255 informs the avoidance reason to the occupant via the communication unit 253 and the navigation device 24 using one or both of the speaker 24b and the display 24c.

In the step S31, as mentioned above, the vehicle control unit 257 determines a target speed, a target steering angle, an operation command of the direction indicator, and the like, in order to travel along with the target travel route transmitted from the management unit 255; and commands the power controller 26, the brake controller 27, the automatic steering controller 28, and the light controller 29. Then, each controller carries out a control of the each device in accordance with a command value.

2. Embodiment 2

Next, the automatic driving and route arbitration system according to Embodiment 2 will be explained. The explanation for constituent parts the same as those in Embodiment 1 will be omitted. The basic configuration of the automatic driving and route arbitration system according to the present embodiment is the same as that of Embodiment 1. Embodiment 2 is different from Embodiment 1 in that, after performing the route change to the received target travel route of each vehicle considering the peripheral traveling state, processing of the route overlapping determining unit 42, the priority determining unit 43, the travel area determining unit 44 and the like is performed.

Figure 22:
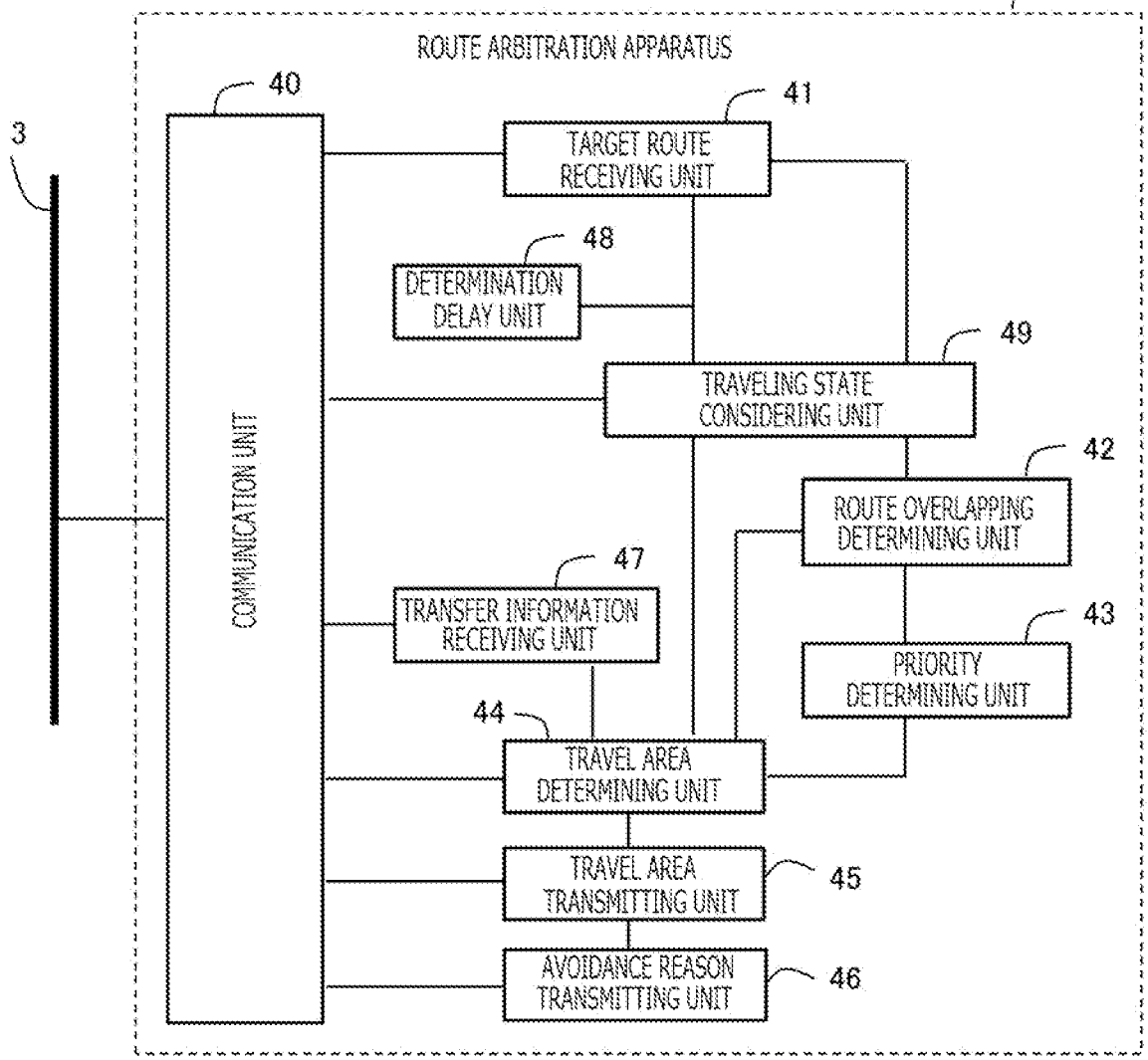
FIG. 22 is a schematic configuration diagram of the route arbitration apparatus according to Embodiment 2.

FIG. 22 shows the schematic configuration diagram of the route arbitration apparatus 1 according to the present embodiment. The route arbitration apparatus 1 is further provided with a traveling state considering unit 49 in addition to from the communication unit 40 to the determination delay unit 48.

If a peripheral traveling state such as an unconsidered obstacle or road state exists in the target travel route of each vehicle, there is a possibility that, even if a travel area is determined based on the target travel route transmitted from each vehicle, a determination result is not in accordance with the peripheral traveling state, and is inappropriate.

Then, the traveling state considering unit 49 changes the received target travel route of each vehicle considering the peripheral traveling state. The route overlapping determining unit 42 and the priority determining unit 43 carry out a determination using the target travel route after changing processing performed by the traveling state considering unit 49. The travel area determining unit 44 determines the priority travel area and the avoidance travel area using the target travel route after changing processing performed by the traveling state considering unit 49, considering the peripheral traveling state. About a vehicle whose target travel route was not changed by the traveling state considering unit 49, the received target travel route is used in the processing of each unit.

According to this configuration, the target travel route of each vehicle is changed considering the peripheral traveling state grasped by the route arbitration apparatus 1. Then, the determination of travel area is performed using the target travel route after changing processing, and the determination result becomes a more appropriate result that is in accordance with the peripheral traveling state.

Herein, as described in Embodiment 1, a traveling state of a vehicle peripheral to each vehicle whose target travel route was received, a state of a peripheral traveling road, and the like, are included in the peripheral traveling state. As the traveling state of the peripheral vehicle, a current traveling state of vehicle (for example, the speed and the vehicle orientation) obtained from a road monitoring system or each vehicle is used. And, as the state of the peripheral traveling road, a road form, a lane, sign information, and the like, obtained from high accuracy map data is used. Also, as the state of the peripheral traveling road, an obstacle, a pedestrian, signal information, traffic jam information, and the like, obtained from a road monitoring system or each vehicle is used.

For example, when there is an impediment for traveling such as an obstacle, a lane decrease, roadworks information, or other vehicle in the target travel route as the peripheral traveling state, the traveling state considering unit 49 changes the target travel route so as to avoid the impediment. When there is traffic information such as traffic jam information, sign information, or traffic light information in the target travel route as the peripheral traveling state, the traveling state considering unit 49 changes the target travel route so as to perform a deceleration, a stopping, an acceleration, or the like, of the vehicle.

Figure 23:
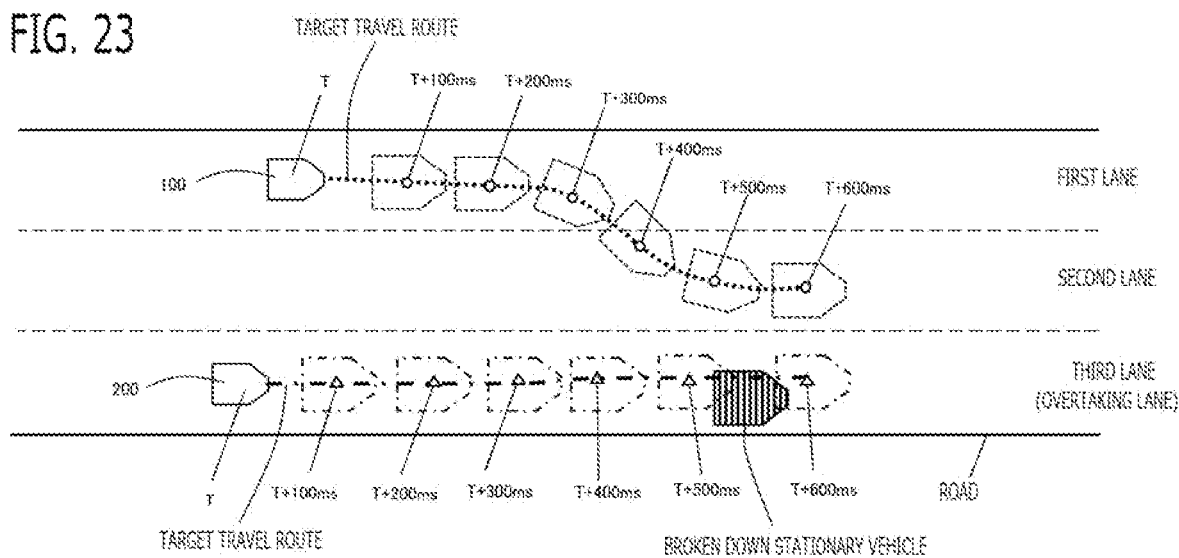
FIG. 23 is a schematic diagram for explaining determination of the travel area according to Embodiment 2.
Figure 24:
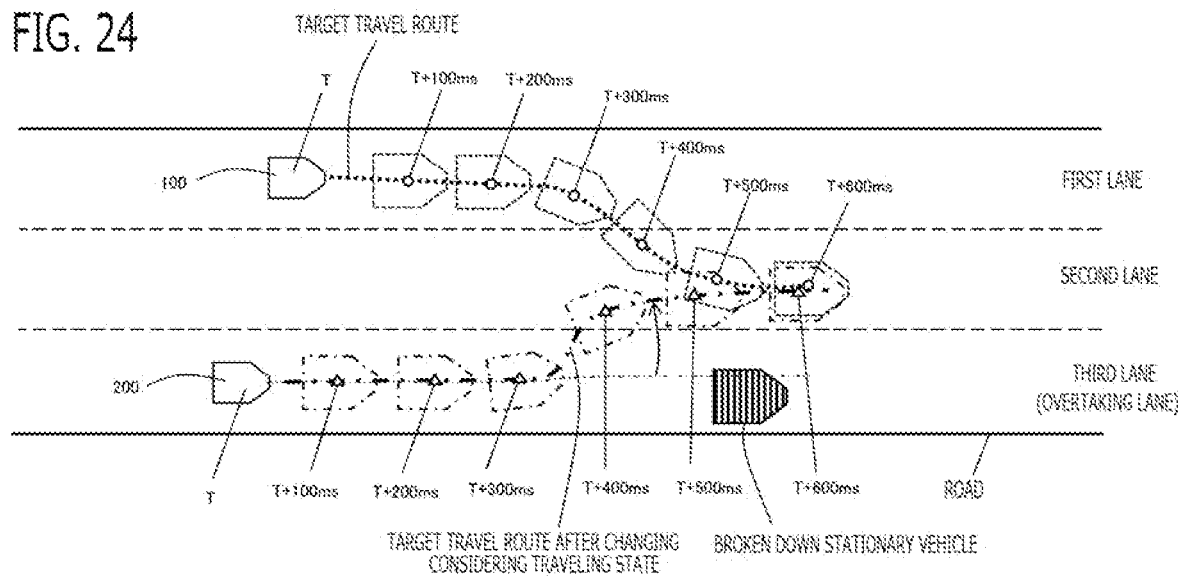
FIG. 24 is a schematic diagram for explaining determination of the travel area according to Embodiment 2.
Figure 25:
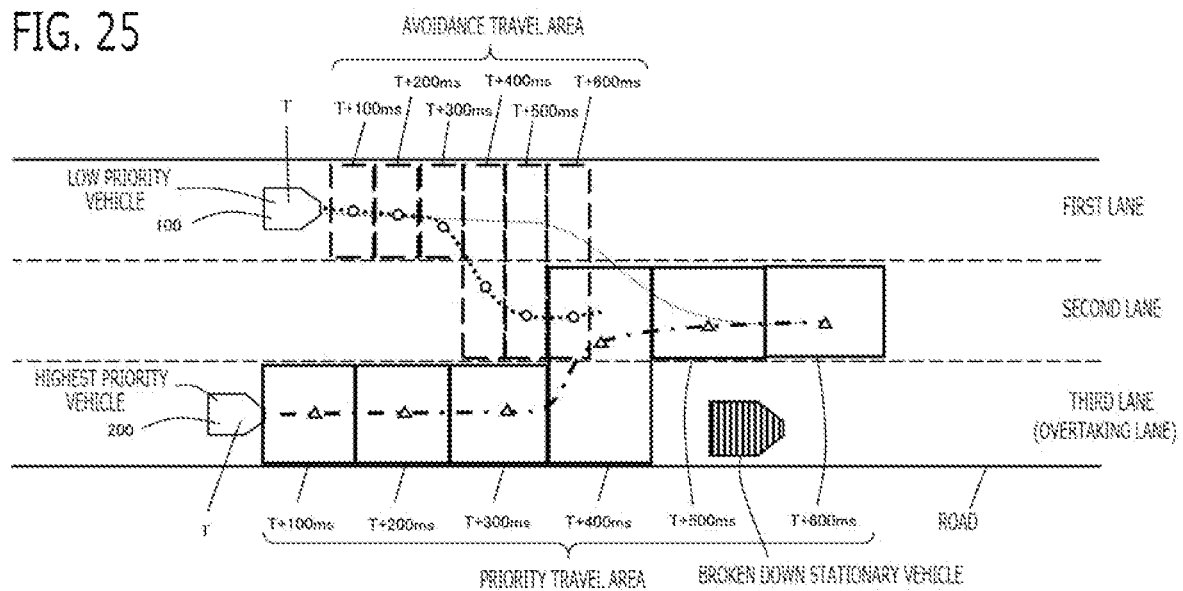
FIG. 25 is a schematic diagram for explaining determination of the travel area according to Embodiment 2.

An example will be explained using FIG. 23, FIG. 24, and FIG. 25. FIG. 23 shows the received target travel routes of the first vehicle 100 and the second vehicle 200. FIG. 24 shows the target travel routes after changing processing of each vehicle considering the peripheral traveling state. FIG. 25 shows the priority travel area and the avoidance travel area after determination which used the target travel route after changing processing of each vehicle.

In FIG. 23, the target travel route of the second vehicle 200 is a route that maintains the traveling lane. However, there is a broken down stationary vehicle that the second vehicle 200 has not yet recognized farther ahead in the traveling lane of the second vehicle 200. On the other hand, the route arbitration apparatus 1 recognized the broken down stationary vehicle from information obtained by a road monitoring system or a preceding vehicle. The target travel route of the first vehicle 100 is starting a lane change to the right side lane 300 ms after the current time T (T+300 ms). The route arbitration apparatus 1 did not recognize any peripheral traveling state to be paid particular attention, about the target travel route of the first vehicle 100.

As shown in FIG. 24, the traveling state considering unit 49 changed the target travel route of the second vehicle 200 so as to avoid the broken down stationary vehicle, considering the broken down stationary vehicle. That is, the traveling state considering unit 49 changed into a target travel route of the second vehicle 200 that starts a lane change to the left side lane 300 ms after the current time T (T+300 ms), which is before the broken down stationary vehicle. On the other hand, the traveling state considering unit 49 did not change the target travel route of the first vehicle 100. As the result, the position of the first vehicle 100 and the position of the second vehicle 200 overlap with each other 400 ms after the current time T (T+400 ms) accompanied with the lane changes by the first vehicle 100 and the second vehicle 200. Accordingly, the route overlapping determining unit 42 determines that the target travel route of the first vehicle 100 after changing processing and the target travel route of the second vehicle 200 overlap with each other.

Then, the priority determining unit 43 determines priority between the second vehicle 200 and the first vehicle 100 after changing processing performed by the traveling state considering unit 49. Since the second vehicle 200 avoids an obstacle ahead of the vehicle, rule 1 is satisfied, and 10 points are added to the evaluation points of the second vehicle 200. As the result, the priority of the second vehicle 200 is higher than the priority of the first vehicle 100. Therefore, the second vehicle 200 is determined as the highest priority vehicle, and the first vehicle 100 is determined as the low priority vehicle.

When it is determined that a mutual overlapping of the target travel routes after changing processing occurs, the travel area determining unit 44 determines the priority travel area which is an area where the second vehicle 200 which is the highest priority vehicle can travel in accordance with the target travel route of the second vehicle 200 after changing processing, considering the peripheral traveling state. The travel area determining unit 44 determines the avoidance travel area which is an area where the first vehicle 100 which is the low priority vehicle can travel while avoiding the priority travel area, considering the peripheral traveling state.

As shown in FIG. 25, the travel area determining unit 44 sets a lane area which has an area setting width in the forward and backward direction and a lane width, centering on a position at each time point of the target travel route of the second vehicle 200 after changing processing, as the priority travel area at each time point. Since the broken down stationary vehicle exists in the current traveling lane unlike the case of FIG. 5, the priority travel area is not expanded to the current traveling lane.

On the other hand, as shown in FIG. 25 by a thick dotted line, the travel area determining unit 44 determines an avoidance travel route of time series which makes the first vehicle 100 decelerate and carryout a lane change behind the priority travel area; and sets a lane area which has the area setting width in the forward and backward direction and the lane width, centering on a position at each time point of the avoidance travel route, as the avoidance travel area at each time point. In this case, when the set avoidance travel area at each time point is a traveling lane of the lane change destination, the travel area determining unit 44 expands the avoidance travel area at each time point in the lateral direction so that the current traveling lane is included.

In this way, a determination of travel area is performed based on the target travel route after changing processing performed by the traveling state considering unit 49, and each vehicle can be made to carry out a smooth traveling operation in order to avoid the obstacle recognized by the route arbitration apparatus 1.

Even if a target travel route change is not performed by the traveling state considering unit 49 similarly to Embodiment 1, the second vehicle 200 changes into a target travel route that avoids the broken down stationary vehicle at the time point of recognizing the broken down stationary vehicle by the periphery monitoring device 25a, and the route arbitration apparatus 1 determines travel area of each vehicle according to it. Accordingly, no serious problem occurs. However, there is a possibility that traveling operation smoothness will worsen slightly due to the first vehicle 100 canceling a lane change, returning to the original lane, or the like, after starting the lane change.

<Flowchart of Route Arbitration Apparatus 1>

Figure 26:
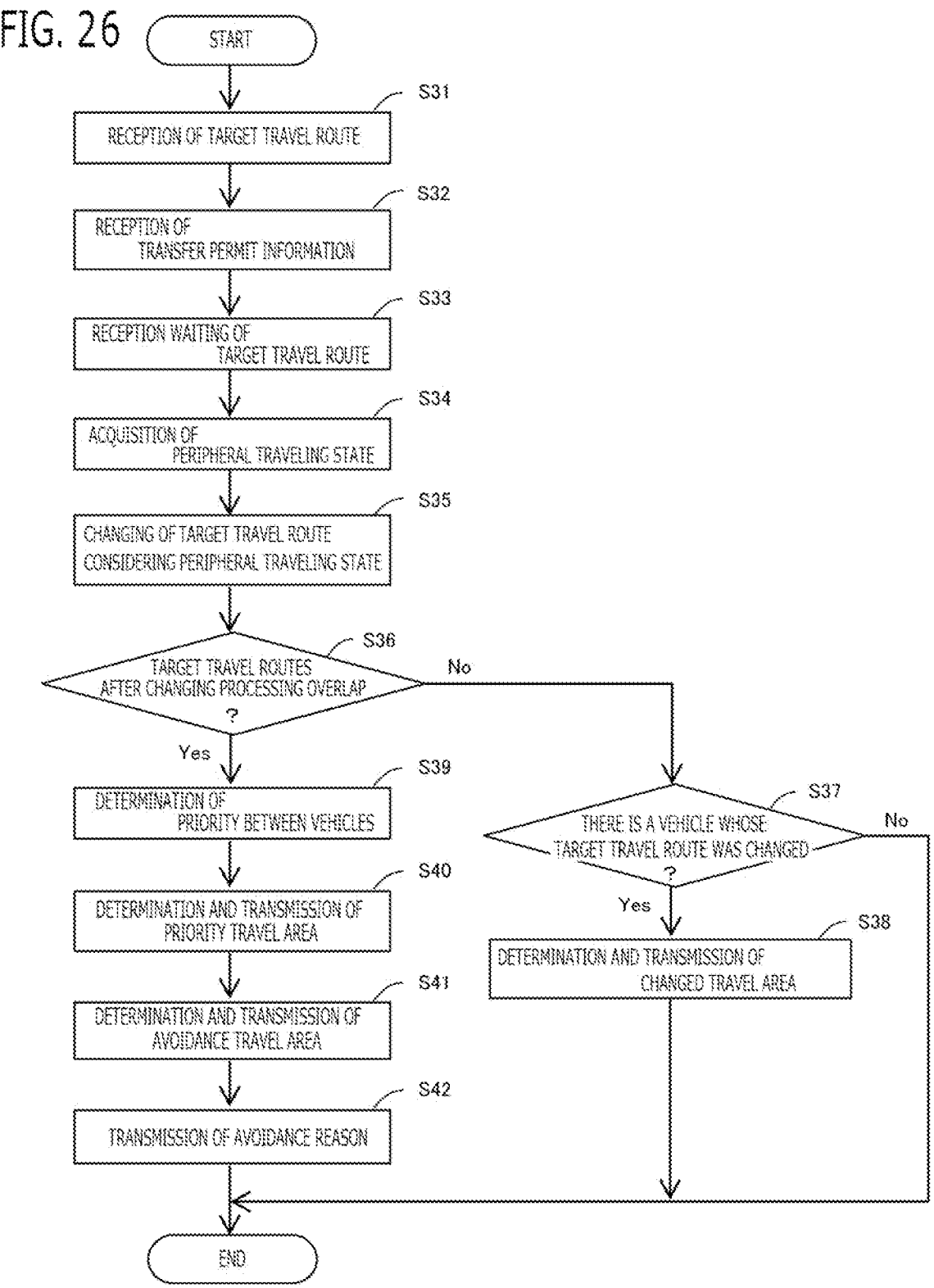
FIG. 26 is a flowchart for explaining the processing of the route arbitration apparatus according to Embodiment 2.

Next, processing of the route arbitration apparatus 1 according to the present embodiment will be explained using the flowchart of FIG. 26. Processing of the flowchart of FIG. 26 is executed repeatedly every constant calculation period, for example.

In the step S31, similarly to Embodiment 1, the target route receiving unit 41 receives a target travel route from each vehicle via the communication unit 40. And, in the step S32, the transfer information receiving unit 47 receives transfer permission information from each vehicle. In the step S33, the determination delay unit 48 makes the determination of the route overlapping determining unit 42 delay, until the target travel routes are received from respective vehicles.

In the step S34, as mentioned above, the traveling state considering unit 49 acquires a peripheral traveling state from a road monitoring system, each vehicle, and the like via the communication unit 40. In the step S35, as mentioned above, the traveling state considering unit 49 changes the received target travel route of each vehicle, considering the peripheral traveling state.

Then, in the step S36, the route overlapping determining unit 42 determines whether or not the target travel routes of respective vehicles after changing processing performed by the traveling state considering unit 49 overlap with each other accompanied with a lane change. When determining that it is overlapping, it advances to the step S39, and when determining that it is not overlapping, it advances to the step S37. The route overlapping determining unit 42 performs the overlapping determination using the received target travel route, about a vehicle whose target travel route was not changed by the traveling state considering unit 49.

In the step S37, the travel area determining unit 44 determines whether or not a vehicle whose target travel route was changed by the traveling state considering unit 49 exists. When determining that it exists, it advances to the step S38, and when determining that it does not exist, it ends processing. In the step S38, similarly to the highest priority vehicle, the travel area determining unit 44 determines a changed travel area which is an area where a changed vehicle whose target travel route was changed can travel in accordance with the changed target travel route of the changed vehicle, considering a peripheral traveling state. Then, the travel area transmitting unit 45 transmits the changed travel area to the vehicle whose target travel route was changed via the communication unit 40, and makes the changed vehicle whose target travel route was changed travel within the changed travel area.

On the other hand, in the step S39, the priority determining unit 43 determines priority between vehicles based on the target travel routes of respective vehicles after changing processing performed by the traveling state considering unit 49. The priority determining unit 43 determines the priority of a vehicle whose target travel route was not changed by the traveling state considering unit 49, based on the received target travel route.

Then, in the step S40, as mentioned above, the travel area determining unit 44 determines the priority travel area which is an area where the highest priority vehicle which is a vehicle with the highest priority among the overlapping vehicles whose target traveling routes after changing processing were determined to overlap mutually can travel in accordance with the target traveling route after changing processing of the highest priority vehicle, considering the peripheral traveling state. Then, the travel area transmitting unit 45 transmits the priority travel area to the highest priority vehicle via the communication unit 40, and makes the highest priority vehicle travel within the priority travel area.

In the step S41, as mentioned above, the travel area determining unit 44 determines an avoidance travel area which is an area where a low priority vehicle which is a vehicle other than the highest priority vehicle among the overlapping vehicles can travel while avoiding the priority travel area, considering the peripheral traveling state. Then, the travel area transmitting unit 45 transmits the avoidance travel area to the low priority vehicle via the communication unit 40, and makes the low priority vehicle travel within the avoidance travel area.

In the step S42, the avoidance reason transmitting unit 46 transmits an avoidance reason that the avoidance travel area is determined, to the low priority vehicle in which the avoidance travel area is determined via communication unit 40. When the target travel route of the highest priority vehicle was changed by the traveling state considering unit 49, the change reason transmitting unit 46 transmits an avoidance reason such as "the travel route is changed considering the peripheral traveling state" to the highest priority vehicle.

3. Embodiment 3

Next, the automatic driving and route arbitration system according to Embodiment 3 will be explained. The explanation for constituent parts the same as those in each of Embodiments 1 and 2 will be omitted. The basic configuration of the automatic driving and route arbitration system according to the present embodiment is the same as that of Embodiments 1 and 2. Embodiment 3 is different from Embodiments 1 and 2 in that a travel area is determined for each small group.

Figure 27:
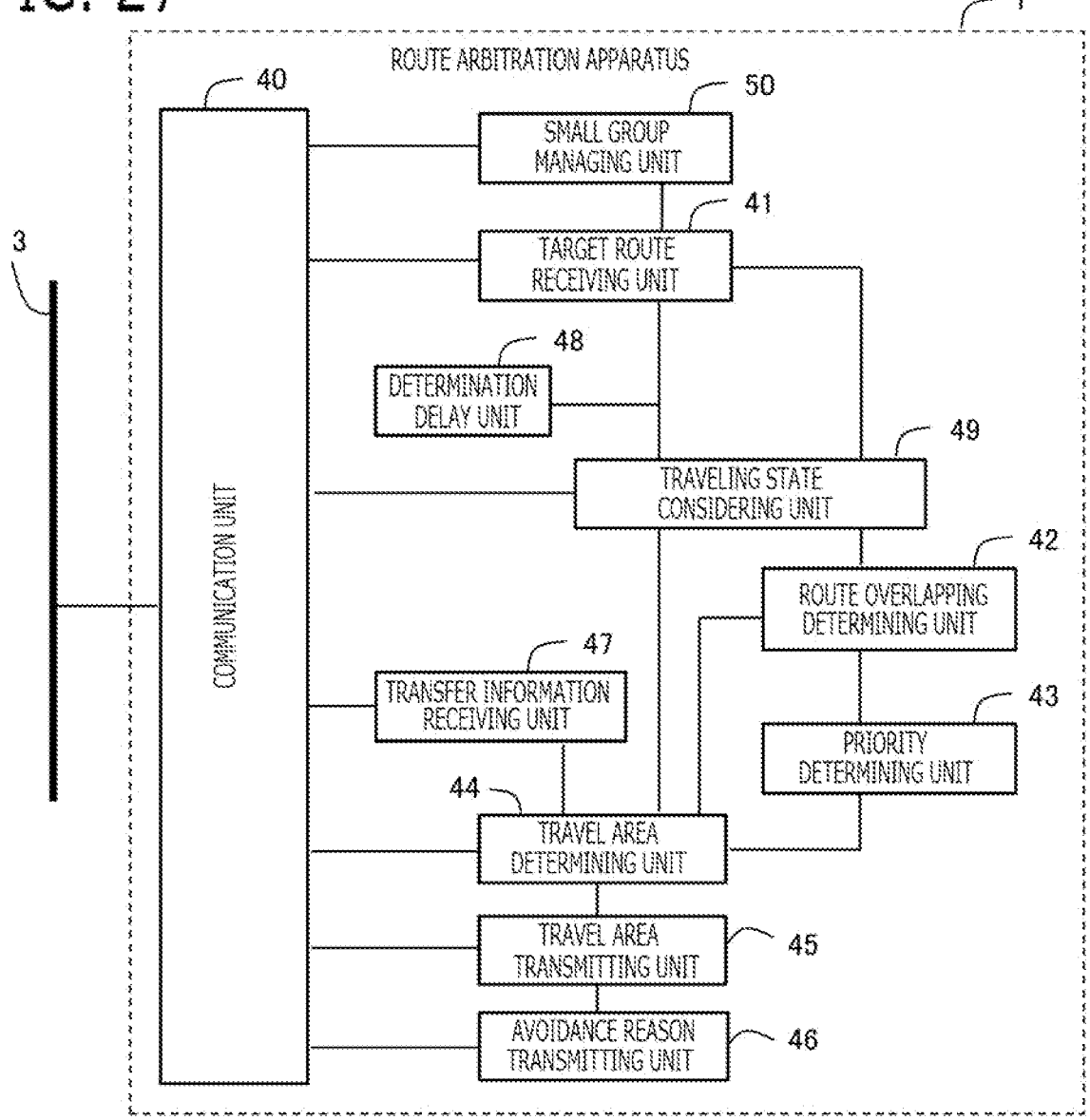
FIG. 27 is a schematic configuration diagram of the route arbitration apparatus according to Embodiment 3.

FIG. 27 shows the schematic configuration diagram of the route arbitration apparatus 1 according to the present embodiment. The route arbitration apparatus 1 is further provided with a small group managing unit 50 in addition to the communication unit 40 to the traveling state considering unit 49.

If the route arbitration apparatus 1 processes the travel routes of all arbitrated vehicles at one time, there is a problem that an amount of arithmetic processing carried out at one time increases. Also, when a vehicle with high latency is included, there is a possibility that this will adversely affect an overall travel route computation.

Therefore, the small group managing unit 50 determines a small group formed of one or more vehicles whose distances are close. And, the route overlapping determining unit 42 determines, for each small group, whether or not vehicle target travel routes overlap with each other, accompanied with a lane change. The priority determining unit 43 determines priority between vehicles for each small group. The travel area determining unit 44, for each small group, determines a travel area of each vehicle so that travel routes do not overlap with each other, considering the priority between vehicles.

According to this configuration, travel areas can be appropriately determined for each small group in which distances are close and travel routes affect each other. Vehicles outside the small group, whose distances are long and whose travel routes do not affect each other, can be excluded from the travel area determination, whereby the determination process can be facilitated. Accordingly, the amount of arithmetic processing carried out at one time can be reduced, and even if a vehicle with high latency is included in a certain small group, an adverse effect on computing the travel routes of other small group can be restricted.

In the present embodiment, the small group managing unit 50 determines a small group formed of one or a multiple of vehicles whose distance, speed, and direction of travel are closer than a determination value, based on a position, a traveling speed, a direction of travel, and the like received from each vehicle. For example, the small group managing unit 50 determines one or more vehicles wherein an inter-vehicle distance is within a determination distance, an inter-vehicle difference in direction of travel is within a determination angle difference, and an inter-vehicle difference in speed is within a determination speed difference, as one small group. When the inter-vehicle distance is equal to or greater than the determination distance, the small group managing unit 50 sets a limit of the small group at that inter-vehicle distance. Vehicles traveling in the same direction in one or a multiple of lanes can be selected by determining the direction of travel and the speed.

Alternatively, the small group managing unit 50 may determine a small group formed of one or more vehicles within a specific range on a road, based on positional information and the like received from each vehicle. For example, the small group managing unit 50 determines one or more vehicles existing on the same road link as one small group, based on road map data and positional information of each vehicle. The road link is a road section between nodes such as freeway ramps or intersections. A section such that the road link is divided into appropriate lengths may also be seen as a road link. A lane change may be dangerous, or a lane change may be prohibited by the traffic rule, in a vicinity of a freeway ramp or a vicinity of an intersection. Accordingly, a vehicle existing at this kind of road converging point may be excluded from a small group. Alternatively, one or more vehicles existing at this kind of road converging point may be determined to be one small group.

As described in Embodiment 1, a multiple of route arbitration apparatus 1 is provided, and shares and arbitrates traveling routes of a multiple of vehicles. One or more vehicles in the same small group are arbitrated by the same route arbitration apparatus 1.

Figures 28, 29:
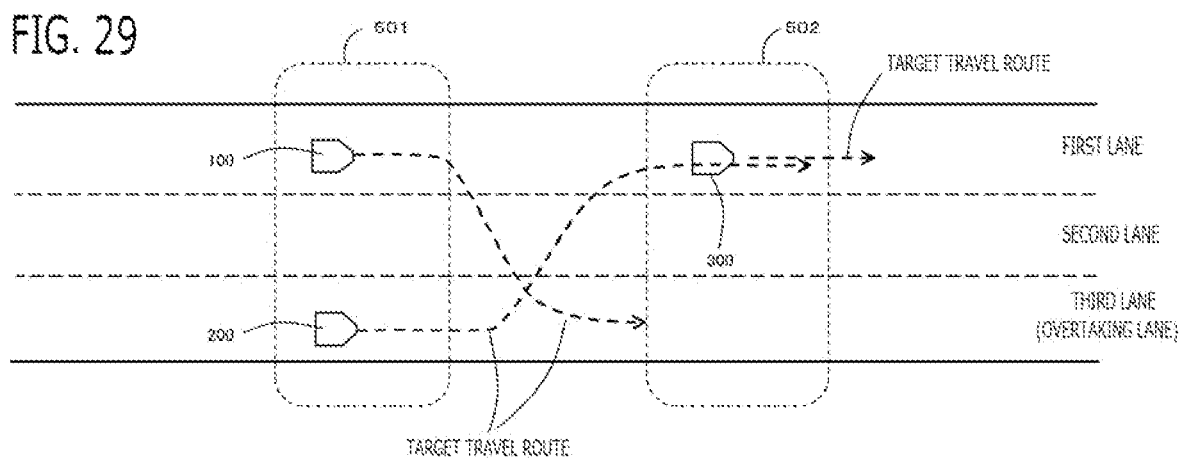
FIG. 28 is a figure for explaining the small group list according to Embodiment 3.
FIG. 29 is a schematic diagram for explaining determination of the travel area according to Embodiment 3.

The small group managing unit 50 creates and updates a small group list whenever determining a small group. The small group list is, for example, a kind of list shown in FIG. 28 showing a correspondence relationship between a small group identification code and a vehicle identification code.

<Consideration of Peripheral Small Group>

A case where the travel area determination results affect among the peripheral small groups is conceivable. Then, in the present embodiment, the route overlapping determining unit 42 sets a small group for which a determination is performed as a determination object small group, and determines whether or not the travel routes of the respective vehicles in the determination object small group overlap with the travel routes of the respective vehicles in a small group in the periphery of (for example, ahead or behind) the determination object small group. When it is determined that a mutual overlapping with the travel routes of the peripheral small group occurs, the priority determining unit 43 determines priority between vehicles, considering the vehicles of the peripheral small group determined to be overlapped. When it is determined that a mutual overlapping with the travel routes of the peripheral small group does not occur, the priority determining unit 43 determines priority between vehicles in the determination object small group.

Then, when it is determined that a mutual overlapping with the travel routes of the peripheral small group occurs, the travel area determining unit 44 determines the priority travel area and the avoidance travel area about the overlapping vehicles determined to be overlapped, considering the priority between vehicles. When it is determined that a mutual overlapping with the travel routes of the peripheral small group does not occur, the travel area determining unit 44 determines the priority travel area and the avoidance travel area, considering the priority between vehicles, in the determination object small group. According to this configuration, travel areas can be determined so as not to overlap with the travel routes of a peripheral small group, even when determining travel routes for each small group.

An example will be explained using FIG. 29 and FIG. 30. In the example of FIG. 29, the first vehicle 100 and the second vehicle 200 are determined as a first small group 501, as the distances, speeds, and directions of travel are close, and the third vehicle 300 is determined as a second small group 502, as the distance between the first vehicle 100 or the second vehicle 200 and the third vehicle 300 is equal to or greater than a determination distance.

However, since the target travel route of the second vehicle 200 approaches the target travel route of the third vehicle 300, the second vehicle 200 needs to reduce speed sharply after changing lane. Then, the route overlapping determining unit 42 determines that the travel route of the second vehicle 200 of the first small group 501 overlaps with the travel route of the third vehicle 300 of the second small group 502. As shown in FIG. 30, the travel area determining unit 44 determines an avoidance travel area of the second vehicle 200 so as not to overlap with the travel route of the third vehicle 300.

In the example of FIG. 30, when considering only the first small group 501, the second vehicle 200 has a higher priority than the first vehicle 100, but the priority determining unit 43 considers the third vehicle 300, lowers the priority of the second vehicle 200, and determines that the first vehicle 100 has a higher priority than the second vehicle 200. Then, the travel area determining unit 44 determines a priority travel area which is an area where the first vehicle 100 which is the highest priority vehicle can travel in accordance with the target travel route of the first vehicle 100. The travel area determining unit 44 determines an avoidance travel area which is an area where the second vehicle 200 which is the low priority vehicle can carryout a lane change while avoiding the target travel route and the priority travel area of the third vehicle 300 by performing deceleration. By considering travel routes between small groups in this way, each vehicle can be made to carry out a smoother traveling operation.

Next, an example will be explained using FIG. 31 and FIG. 32. In the example of FIG. 31, similarly to the example of FIG. 29, the first vehicle 100 and the second vehicle 200 are determined as the first small group 501, and the third vehicle 300 is determined as the second small group 502.

Unlike the example of FIG. 29, since the third vehicle 300 carries out a lane change, the target travel route of the second vehicle 200 does not approach the target travel route of the third vehicle 300. Accordingly, the second vehicle 200 can travel without changing after changing lane. Then, the route overlapping determining unit 42 determines that the travel routes of the vehicles of the first small group 501 and the travel route of the vehicle of the second small group 502 do not overlap.

Then, considering only the first small group 501, the priority determining unit 43 determines that the second vehicle 200 has a higher priority than the first vehicle 100. Then, as shown in FIG. 32, the travel area determining unit 44 determines a priority travel area which is an area where the second vehicle 200 which is the highest priority vehicle can travel in accordance with the target travel route of the second vehicle 200. The travel area determining unit 44 determines an avoidance travel area which is an area where the first vehicle 100 which is the low priority vehicle can carry out a lane change while avoiding the priority travel area by performing deceleration.

As another example of FIG. 29 and FIG. 30, if the second vehicle 200 is a high priority vehicle such an emergency vehicle or the like, the travel route of the second vehicle 200 should be prioritized over that of the third vehicle 300. Accordingly, the route overlapping determining unit 42 determines whether or not the travel routes of the vehicles in the determination object small group overlap with the travel routes of the vehicles in a small group in the periphery of the determination object small group. When it is determined that a mutual overlapping with the travel routes of the peripheral small group occurs, the priority determining unit 43 may determine priority between the vehicles whose travel routes overlap between the small groups. When it is determined that a mutual overlapping with the traveling routes of the peripheral small group occurs, the travel area determining unit 44 may change the travel area of a vehicle with lower priority, among vehicles whose travel routes overlap between small groups, so as not to overlap with the travel area of a vehicle with higher priority.

In this case, in the example of FIG. 29, the priority determining unit 43 determines priority between the second vehicle 200 of the first small group 501 and the third vehicle 300 of the second small group 502, whose target travel routes overlap with each other, and determines that the second vehicle 200 has higher priority than the third vehicle 300. Then, as shown in FIG. 33, the travel area determining unit 44 determines a priority travel area which is an area where the second vehicle 200 which is a higher priority vehicle can travel in accordance with the target travel route of the second vehicle 200. Then, the travel area determining unit 44 determines an avoidance travel area which is an area where the third vehicle 300 which is a lower priority vehicle can carry out a lane change in order to avoid the priority travel area of the second vehicle 200. And, the travel area determining unit 44 determines an avoidance travel area which is an area where the first vehicle 100 which is a lower priority vehicle can carry out a lane change while avoiding the priority travel area of the second vehicle 200. By considering priority between small groups in this way, a vehicle with high priority between small groups can be made to travel with priority.

<Flowchart of Route Arbitration Apparatus 1>

Next, processing of the route arbitration apparatus 1 according to the present embodiment will be explained using the flowchart of FIG. 34. Processing of the flowchart of FIG. 34 is executed repeatedly every constant calculation period, for example.

In the step S41, as mentioned above, the small group managing unit 50 determines a small group formed of one more vehicles whose distances are close, based on positional information and the like received from each vehicle of arbitration object via the communication unit 40.

In the step S42, the target route receiving unit 41 receives a target travel route from each vehicle via the communication unit 40, for each small group. At this time, the target route receiving unit 41 also receives a target travel route from each vehicle in a peripheral small group. And, in the step S43, the transfer information receiving unit 47 receives transfer permission information from each vehicle, for each small group. In the step S44, the determination delay unit 48 makes the determination of the route overlapping determining unit 42 delay, until the target travel routes are received from respective vehicles of the same small group.

In the step S45, the traveling state considering unit 49 acquires a peripheral traveling state from a road monitoring system, each vehicle, and the like via the communication unit 40, for each small group. In the step S46, the traveling state considering unit 49 changes the received target travel route of each vehicle considering the peripheral traveling state, for each small group.

Then, in the step S47, the route overlapping determining unit 42 determines whether or not the target travel routes of respective vehicles overlap with each other accompanied with a lane change, for each small group. In the present embodiment, the route overlapping determining unit 42 sets the small group for which a determination is performed as a determination object small group, and determines whether or not target travel routes of respective vehicles in the determination object small group overlap with travel routes of respective vehicles in the small group in a periphery of the determination object small group.

In the step S48, the priority determining unit 43 determines priority between vehicles for each small group. In the present embodiment, when it is determined that a mutual overlapping with the travel routes of the peripheral small group occurs, the priority determining unit 43 determines priority between vehicles, considering the vehicles of the peripheral small group determined to be overlapped. At this time, the priority determining unit may determine priority between the vehicles whose traveling routes overlap between the small groups.

In the step S49, the travel area determining unit 44 determines the priority travel area and the avoidance travel area, considering the priority between vehicles, for each small group. In the present embodiment, when it is determined that a mutual overlapping with the traveling routes of the peripheral small group occurs, the travel area determining unit 44 determines the priority travel area and the avoidance travel area about the overlapping vehicles whose traveling routes overlap with the peripheral small group, considering priority between vehicles. At this time, among vehicles whose travel routes overlap between small groups, the travel area determining unit 44 may determine, as the avoidance travel area of the low priority vehicle with lower priority, an area where the low priority vehicle can travel while avoiding the priority travel area of the highest priority vehicle with higher priority.

Then, in the step S50, the travel area transmitting unit 45 transmits the determination result of travel area to each vehicle, for each small group. In the step S51, the avoidance reason transmitting unit 46 transmits an avoidance reason that the avoidance travel area is determined, to the low priority vehicle in which the avoidance travel area is determined, for each small group.

4. Embodiment 4

Next, the automatic driving and route arbitration system according to Embodiment 4 will be explained. The explanation for constituent parts the same as those in each of Embodiments 1, 2, and 3 will be omitted. The basic configuration of the automatic driving and route arbitration system according to the present embodiment is the same as that of Embodiments 1, 2, and 3. Embodiment 4 is different from Embodiments 1, 2, and 3 in that the route arbitration apparatus is mounted in a vehicle.

Figure 35:
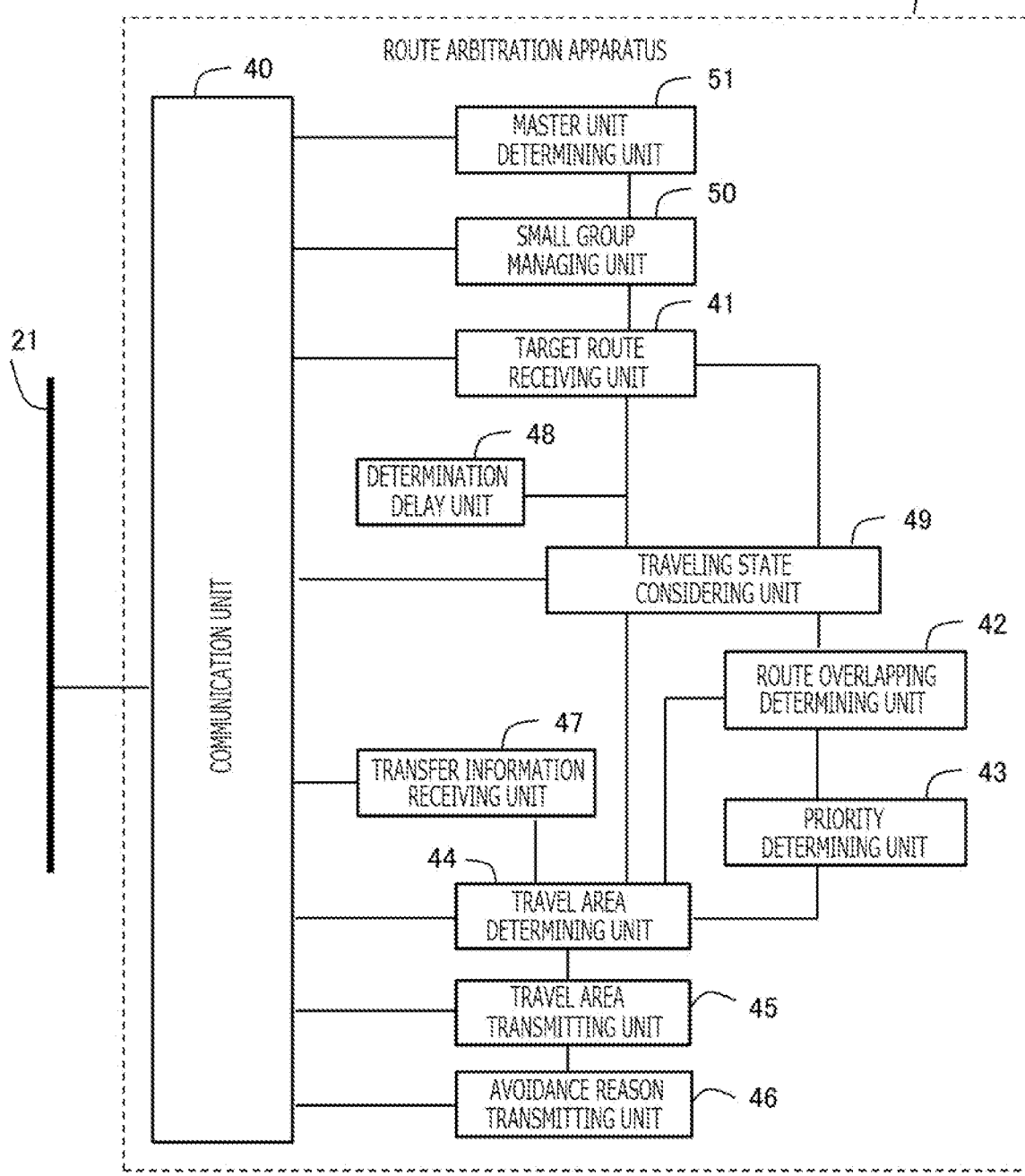
FIG. 35 is a schematic configuration diagram of the route arbitration apparatus according to Embodiment 4.

FIG. 35 shows the schematic configuration diagram of the route arbitration apparatus 1 according to the present embodiment. The route arbitration apparatus 1 is further provided with a master unit determining unit 51, in addition to from the communication unit 40 to the small group managing unit 50.

In the present embodiment, the route arbitration apparatus 1 is mounted in each vehicle. The master unit determining unit 51 determines a master unit that operates among a multiple of peripheral vehicles in which the route arbitration apparatus 1 is mounted. Then, the route arbitration apparatus 1 controls travel routes of the multiple of peripheral vehicles when it is determined that the route arbitration apparatus 1 itself is the master unit.

According to this configuration, without each vehicle depending on the route arbitration apparatus 1 provided in a server like Embodiments 1 to 3, a master unit is determined among vehicles in which the route arbitration apparatus 1 is mounted, and inter-vehicle communication is carried out, whereby an inter-vehicle management of travel routes can be carried out autonomously.

In the present embodiment, the route arbitration apparatus 1 (the communication unit 40) of each vehicle carries out wireless communication with the route arbitration apparatus 1 of a peripheral vehicle. The route arbitration apparatus 1 of each vehicle may carry out wireless communication with the route arbitration apparatus 1 of a peripheral vehicle via a base station. Also, as the communication device 72 is connected to the vehicle-mounted network 21, the route arbitration apparatus 1 may be connected to the automatic driving controller 25, the communication device 22, and the like, via the vehicle-mounted network 21, and may carry out wireless communication with the route arbitration apparatus 1 of a peripheral vehicle using the communication device 72, which is adopted as a wireless communication device.

The master unit determining unit 51 exchanges a master unit management list of vehicle ID, area ID, master unit ID, and the like, with the route arbitration apparatus 1 (the master unit determining unit 51) of each vehicle existing in the periphery, and manages setting of a master unit and a slave unit. Vehicle ID is an identification code for identifying a vehicle, area ID is an identification code of a region in which a vehicle is positioned, and master unit ID is an identification code of the route arbitration apparatus 1 that is the master unit. The master unit determining unit 51 of an arbitrary vehicle may determine the route arbitration apparatus 1 that is to be the master unit randomly from among vehicles existing in the same arbitration region, or may determine a vehicle that exists in a vicinity of a center of the same arbitration region. Also, when the vehicle set as the master unit departs from the arbitration region, the master unit determining unit 50 transmits departure information to the peripheral route arbitration apparatus 1, and transfers the master unit to other route arbitration apparatus 1.

Similarly to Embodiments 1 to 3, the route arbitration apparatus 1 which is set as the master unit receives a target travel route and the like from the automatic driving controller 25 of each vehicle positioned in the same arbitration region, and after determining the travel area of each vehicle, transmits a travel area determination result and the like to the automatic driving controller 25 of each vehicle. The route arbitration apparatus 1 which is set as the master unit acquires information from a road monitoring system or the like via a base station. On the other hand, the route arbitration apparatus 1 of each vehicle which is not set as the master unit stops functions other than the master unit determining unit 51 that manages master unit setting. And, the automatic driving controller 25 of each vehicle which is not set as the master unit transmits a target travel route and the like to the route arbitration apparatus 1 of the vehicle which is set as the master unit, and receives a travel area determination result and the like from the route arbitration apparatus 1 of the vehicle which is set as the master unit.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the route arbitration apparatus 1 is provided with the determination delay unit 48, which makes a determination by the route overlapping determining unit 42 delay until a target travel route is received from each vehicle. However, embodiments of the present disclosure are not limited to the foregoing case. That is, the route arbitration apparatus 1 may not be provided with the determination delay unit 48, and the processes of the route overlapping determining unit 42, the priority determining unit 43, and the travel area determining unit 44 may be carried out using a latest target travel route received from each vehicle at each computation timing.

(2) In each of the above-mentioned Embodiments, there has been explained the case where the route arbitration apparatus 1 is provided with the avoidance reason transmitting unit 46 and the transfer information receiving unit 47. However, embodiments of the present disclosure are not limited to the foregoing case. That is, the route arbitration apparatus 1 may not be provided with one or either of the avoidance reason transmitting unit 46 and the transfer information receiving unit 47.

(3) In the above Embodiments 3 and 4, there was explained the case where the route arbitration apparatus 1 is provided with the traveling state considering unit 49 which changes the received target travel route of each vehicle, considering the peripheral traveling state; and the route overlapping determining unit 42 and the priority determining unit 43 carryout a determination using the target travel route after changing processing performed by the traveling state considering unit 49. However, in the above Embodiments 3 and 4, the route arbitration apparatus 1 may not be provided with the traveling state considering unit 49; and the route overlapping determining unit 42 and the priority determining unit 43 may determine using the received target travel routes.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Route Arbitration Apparatus, 2 Server, 3 Network, 25 Automatic Driving Controller, 40 Communication Unit, 41 Target Route Receiving Unit, 42 Route Overlapping Determining Unit, 43 Priority Determining Unit, 44 Travel Area Determining Unit, 45 Travel Area Transmitting Unit, 46 Avoidance Reason Transmitting Unit, 47 Transfer Information Receiving Unit, 48 Determination Delay Unit, 49 Traveling State Considering Unit, 50 Small Group Managing Unit, 51 Master Unit Determining Unit

What is claimed is:

1. A route arbitration apparatus comprising at least one processor configured to implement:
communicator that communicates with a multiple of vehicles;
a target route receiver that receives a target travel route from each vehicle;

a route overlapping determiner that determines whether or not the target travel routes of respective vehicles overlap with each other;

a priority determiner that determines priority between vehicles; and a travel area determiner that, when it is determined that a mutual overlapping of the target travel routes occurs, determines a priority travel area which is an area where the highest priority vehicle which is a vehicle with the highest priority among the overlapping vehicles whose target travel routes were determined to overlap mutually can travel in accordance with the target travel route of the highest priority vehicle, and determines an avoidance travel area which is an area where a low priority vehicle which is a vehicle other than the highest priority vehicle among the overlapping vehicles can travel while avoiding the priority travel area; and a travel area transmitter that transmits the priority travel area to the highest priority vehicle via the communicator and makes the highest priority vehicle travel within the priority travel area, and transmits the avoidance travel area to the low priority vehicle and makes the low priority vehicle travel within the avoidance travel area.

2. The route arbitration apparatus according to claim 1, wherein the travel area determiner determines an area at each time point where the highest priority vehicle can travel in accordance with the target travel route of the highest priority vehicle at future each time point, as the priority travel area; and determines an area at each time point where the low priority vehicle can travel while avoiding the priority travel area at each time point, as the avoidance travel area.

3. The route arbitration apparatus according to claim 1, wherein the travel area determiner determines an area which includes a multiple of traveling lanes including a traveling lane where the highest priority vehicle can travel and which does not become disturbance of traveling of peripheral vehicle, as the priority travel area; and determines an area which includes a multiple of traveling lanes including a traveling lane where the low priority vehicle can travel and which does not become disturbance of traveling of peripheral vehicle, as the avoidance travel area.

4. The route arbitration apparatus according to claim 1, wherein, when determining the priority travel area of the highest priority vehicle, the travel area determiner considers a peripheral traveling state of the highest priority vehicle; and when determining the avoidance travel area of the low priority vehicle, the travel area-determiner considers a peripheral traveling state of the low priority vehicle.

5. The route arbitration apparatus according to claim 1, wherein, when a lane change is included in the target travel route of the highest priority vehicle, the travel area determiner determines an area where the highest priority vehicle can travel along a traveling lane which is a destination for the lane change and a current traveling lane, as the priority travel area; and when a lane change is not included in the target travel route of the highest priority vehicle, the travel area determiner determines an area where the highest priority vehicle can travel along a current traveling lane, as the priority travel area.

6. The route arbitration apparatus according to claim 1, wherein, when mutual overlapping of the target travel routes occurs accompanied with a lane change of the low priority vehicle, the travel area determiner determines an area where the low priority vehicle can perform a lane change while avoiding the priority travel area, as the avoidance travel area.

7. The route arbitration apparatus according to claim 1, wherein, when mutual overlapping of the target travel routes occurs accompanied with a lane change of the low priority vehicle, the travel area determiner determines an area where the low priority vehicle can travel along a current traveling lane while avoiding the priority travel area, as the avoidance travel area.

8. The route arbitration apparatus according to claim 1, wherein the travel area determiner determines an area where the low priority vehicle can travel while avoiding the priority travel area by performing deceleration or acceleration, as the avoidance travel area.

9. The route arbitration apparatus according to claim 1, wherein the travel area determiner determines an area where the low priority vehicle can travel while avoiding the priority travel area by performing a lane change, as the avoidance travel area.

10. The route arbitration apparatus according to claim 1, wherein, when there are a multiple of the low priority vehicles, the travel area determiner determines an area where the low priority vehicle with the lower priority can travel while avoiding the priority travel area of the highest priority vehicle and while avoiding the avoidance travel area of the low priority vehicle with the higher priority, as the avoidance travel area of the multiple of low priority vehicles.

11. The route arbitration apparatus according to claim 1, wherein the priority determiner determines the priority between vehicles by combining a multiple of rules relating to at least a necessity of a lane change.

12. The route arbitration apparatus according to claim 1, further comprising a determination delayer that makes a determination of the route overlapping determiner delay until the target travel routes are received from respective vehicles.

13. The route arbitration apparatus according to claim 1, further comprising an avoidance reason transmitter that transmits an avoidance reason that the avoidance travel area is determined, to the low priority vehicle.

14. The route arbitration apparatus according to claim 1, further comprising a transfer information receiver that receives transfer permission information indicating that a travel route may be transferred to other vehicle, from each vehicle, wherein the priority determiner makes the priority of a vehicle from which the transfer permission information was received lower than the priority of a vehicle from which the transfer permission information was not received.

15. The route arbitration apparatus according to claim 1, further comprising a traveling state considering considerer that changes the received target travel route, considering a peripheral traveling state, wherein the route overlapping determiner determines whether or not the target travel routes of respective vehicles after changing processing by the traveling state considering considerer overlap with each other, wherein the priority determiner determines the priority between the vehicles after changing processing, and wherein, when it is determined that a mutual overlapping of the target travel routes after changing processing occurs, the travel area determiner determines the priority travel area which is an area where the highest priority vehicle can travel in accordance with the target travel route of the highest priority vehicle after changing processing, considering a peripheral traveling state, and determines the avoidance travel area which is an area where the low priority vehicle can travel while avoiding the priority travel area considering a peripheral traveling state.

16. The route arbitration apparatus according to claim 15, wherein, when it is determined that a mutual overlapping of the target travel routes after changing processing does not occur and the target travel route is changed by the traveling state considering considerer, the travel area determiner determines a changed travel area which is an area where a changed vehicle whose target travel route was changed can travel in accordance with the changed target travel route of the changed vehicle, considering a peripheral traveling state, and wherein the travel area transmitter transmits the changed travel area to the changed vehicle via the communicator, and makes the changed vehicle travel within the changed travel area.

17. The route arbitration apparatus according to claim 1, further comprising a small group manager that determines a small group formed of one or more vehicles whose distances are close, wherein the route overlapping determiner determines, for each small group, whether or not the target travel routes of respective vehicles overlap with each other, wherein the priority determiner determines priority between vehicles, for each small group, and wherein the travel area determiner determines the priority travel area and the avoidance travel area, considering the priority between vehicles, for each small group.

18. The route arbitration apparatus according to claim 17, wherein the route overlapping determiner sets the small group for which a determination is performed, as a determination object small group, and determines whether or not target travel routes of respective vehicles in the determination object small group overlap with travel routes of respective vehicles in the small group in a periphery of the determination object small group, wherein, when it is determined that a mutual overlapping with the traveling routes of the peripheral small group occurs, the priority determiner determines priority between vehicles, considering the vehicles of the peripheral small group determined to be overlapped, and wherein, when it is determined that a mutual overlapping with the traveling routes of the peripheral small group occurs, the travel area determiner determines the priority travel area and the avoidance travel area about the overlapping vehicles determined to be overlapped, considering the priority between vehicles.

19. The route arbitration apparatus according to claim 17, wherein the route overlapping determiner sets the small group for which a determination is performed, as a determination object small group, and determines whether or not target travel routes of respective vehicles in the determination object small group overlap with travel routes of respective vehicles in the small group in a periphery of the determination object small group, wherein, when it is determined that a mutual overlapping with the traveling routes of the peripheral small group occurs, the priority determiner determines priority between the vehicles whose traveling routes overlap between the small groups, wherein, when it is determined that a mutual overlapping with the traveling routes of the peripheral small group occurs, the travel area determiner determines the priority travel area and the avoidance travel area about the overlapping vehicles whose traveling routes overlap between the small groups, considering the priority between vehicles.

20. The route arbitration apparatus according to claim 17, wherein the small group manager determines the small group formed of one or more vehicles whose distance, speed, and traveling direction are closer than a determination value, or determines the small group formed of one or more vehicles within a specific range on a road.

21. The route arbitration apparatus according to claim 1, wherein a multiple of the route arbitration apparatuses are provided, the multiple of route arbitration apparatuses share and control travel routes of a multiple of vehicles, and control for each small group formed of one or more vehicles, and one or more vehicles of the same small group are controlled by the same route arbitration apparatus.

22. The route arbitration apparatus according to claim 1, wherein the route arbitration apparatus is provided in a server connected to a network.

23. The route arbitration apparatus according to claim 1, wherein the route arbitration apparatus is mounted in a vehicle, is provided with a master unit determiner that determines a master unit that operates among a multiple of peripheral vehicles in which the route arbitration apparatus is mounted, and controls travel routes of the multiple of peripheral vehicles when it is determined that the route arbitration apparatus itself is the master unit.

24. An automatic driving controller comprising at least one processor configured to implement:

a recognizer that recognizes a peripheral traveling state of an own vehicle;

a target travel route generator that determines a target travel route where the own vehicle travels, considering the peripheral traveling state;

a manager that transmits the target travel route to a route arbitration apparatus which arbitrates traveling routes of a multiple of vehicles via a communication device, and receives a priority travel area or an avoidance travel area from the route arbitration apparatus;

a target travel route changer that changes the target travel route considering the peripheral traveling state so that the target travel route becomes within the priority travel area or the avoidance travel area, when the priority travel area or the avoidance travel area was received; and a vehicle controller that makes the own vehicle travel along with the target travel route, wherein the priority travel area is an area where a highest priority vehicle is allowed to travel when target travel routes of the multiple vehicles overlap, and the avoidance travel area is an area where a low priority vehicle having a lower priority than the highest priority vehicle is allowed to travel while avoiding the priority travel area.

25. An automatic driving and route arbitration system comprising:
- the route arbitration apparatus according to claim 1; and
- a multiple of vehicles each of which mounted the automatic driving controller comprising at least one processor configured to implement:
- a recognizer that recognizes a peripheral traveling state of an own vehicle;
- a target travel route generator that determines a target travel route where the own vehicle travels, considering the peripheral traveling state;
- a manager that transmits the target travel route to a route arbitration apparatus which arbitrates traveling routes of a multiple of vehicles via a communication device, and receives a priority travel area or an avoidance travel area from the route arbitration apparatus;
- a target travel route changer that changes the target travel route considering the peripheral traveling state so that the target travel route becomes within the priority travel area or the avoidance travel area, when the priority travel area or the avoidance travel area was received; and
- a vehicle controller that makes the own vehicle travel along with the target travel route.

* * * * *